United States Patent
Kone et al.

(10) Patent No.: US 8,295,217 B2
(45) Date of Patent: Oct. 23, 2012

(54) METHOD AND APPARATUS FOR A DEVICE POWER SAVINGS CLASS

(75) Inventors: Mamadou Kone, Jhudong Township (TW); Ming-Hung Tao, Tainan (TW); Ying-Chuan Hsiao, Jhubei (TW)

(73) Assignee: ACER Incorporated, Taipei Hsien (TW)

( * ) Notice: Subject to any disclaimer, the term of this patent is extended or adjusted under 35 U.S.C. 154(b) by 519 days.

(21) Appl. No.: 12/500,651

(22) Filed: Jul. 10, 2009

(65) Prior Publication Data

US 2010/0008278 A1 Jan. 14, 2010

Related U.S. Application Data

(60) Provisional application No. 61/079,970, filed on Jul. 11, 2008.

(51) Int. Cl.
*G08C 17/00* (2006.01)

(52) U.S. Cl. ............. 370/311; 370/318; 455/343.1; 455/343.3; 455/552.1; 455/574

(58) Field of Classification Search ............... 370/311; 455/343.1, 574, 343.3, 343.2, 552.1, 343.4
See application file for complete search history.

(56) References Cited

U.S. PATENT DOCUMENTS

| | | | | |
|---|---|---|---|---|
| 7,155,261 B2* | 12/2006 | Chen | ............. | 455/574 |
| 7,986,949 B2* | 7/2011 | Ryu et al. | ............. | 455/439 |
| 2004/0141617 A1* | 7/2004 | Volpano | ............. | 380/270 |
| 2006/0025134 A1* | 2/2006 | Cho et al. | ............. | 455/435.1 |
| 2006/0240799 A1* | 10/2006 | Kim et al. | ............. | 455/343.2 |
| 2007/0072578 A1* | 3/2007 | Lee et al. | ............. | 455/343.1 |
| 2007/0143637 A1* | 6/2007 | Tsai | ............. | 713/300 |
| 2007/0298836 A1* | 12/2007 | Yanover | ............. | 455/552.1 |
| 2008/0072086 A1* | 3/2008 | Kim | ............. | 713/323 |
| 2008/0095092 A1* | 4/2008 | Kim | ............. | 370/311 |
| 2008/0182567 A1* | 7/2008 | Zhu et al. | ............. | 455/418 |

* cited by examiner

*Primary Examiner* — Ricky Ngo
*Assistant Examiner* — Rasheed Gidado
(74) *Attorney, Agent, or Firm* — Thomas|Kayden

(57) ABSTRACT

A method is provided for a device in a wireless communication network including a base station. The method includes sending a sleep mode request to the base station; and receiving a sleep mode response including negotiating parameters from the base station. The method also includes entering a sleep mode determined by a single power saving class applicable to all traffic conditions between the device and the base station; and communicating with the base station based on the sleep mode. Further, the single power saving class is used to define a frame structure for configuring frames to form alternating listening windows and sleep windows, to define an initial sleep window, and to define a default listening window.

21 Claims, 21 Drawing Sheets

METHOD AND APPARATUS FOR A DEVICE POWER SAVINGS CLASS

CROSS REFERENCE TO RELATED APPLICATIONS

This application is based upon and claims the benefit of priority from U.S. Provisional Patent Application No. 61/079,970, filed Jul. 11, 2008, the entire contents of which are incorporated herein by reference.

TECHNICAL FIELD

The present disclosure relates generally to methods and devices for wireless communication systems and, more particularly, to methods and devices for wireless communication systems to provide power savings through a device power savings class.

BACKGROUND

Due to an increasing number of wireless devices and a growing demand for wireless services, wireless communication systems continue to expand. To meet the growing demand, and to increase interoperability and reduce costs, various sets of standards have been introduced for wireless communications. One such set of standards developed for wireless communication is the Institute of Electrical and Electronics Engineers, Inc. (IEEE) 802.16. IEEE 802.16 includes the family of standards developed by the IEEE 802.16 committee, establishing standards for broadband wireless access. In part, the IEEE 802.16 family of standards defines interoperability of broadband Wireless Metropolitan Area Networks (WirelessMAN). Generally speaking, WirelessMANs are large networks utilizing wireless infrastructure to form connections between subscriber stations. WiMAX, a term defined and promoted by The WiMAX Forum™, is commonly used to refer to WirelessMANs and wireless communication and communication networks that are based on the IEEE 802.16 standard. As used herein, the term "WiMAX" refers to any communication network, system, apparatus, device, method, etc. that utilizes or is based on the 802.16 family of standards.

Included in the 802.16 family of standards is the IEEE 802.16e standard, which relates to mobile WiMAX. An update to the IEEE 802.16e standard has been proposed, called IEEE 802.16m. The IEEE 802.16e standard, and the proposed IEEE 802.16m standard, propose grouping connections according to their Quality of Service types to create Power Saving Classes (PSC). Each type of PSC has a set of message exchange procedures for its definition/activation/deactivation. Moreover, IEEE 802.16e, and the proposed IEEE 802.16m, define a general set of parameters and rules that can be used to design different sleep and listening windows. IEEE 802.16e enumerates three kinds of PSCs:

Type I Power Saving Class (Type 1 PSC): Groups together BE (Best Effort service) and NRT-VR (Non-Real-Time Variable Rate service) connections. A fixed length listening window alternates with a sleep window, where each sleep window is twice the size of a previous sleep window, to some maximum duration sleep window size. If there is incoming data, the next sleep window will be the length of the first sleep window.

Type II Power Saving Class (Type 2 PSC): Groups together UGS (Unsolicited Grant service), ERT-VR (Extended Real-Time Variable Rate service), and RT-VR (Real-Time Variable Rate service) connections. A fixed length listening window alternates with a fixed length sleep window.

Type III Power Saving Class (Type 3 PSC): Groups together multicast connections and management connections. A single sleep window has a duration based on an expected time period before activity. The duration and separation of the expected time period of activity and the sleep window, i.e., the expected time period before activity, is set based on an expected arrival of a next portion of data or next expected ranging request.

In addition, IEEE 802.16e, and the proposed IEEE 802.16m, supports a device mode. A device mode provides energy savings on a mobile station when the traffic load is low. A device mode consists of alternating unavailability intervals and availability intervals. Generally, during the unavailability interval the device cuts off all contact with its serving base station and conserves its energy. During the availability interval, the device actively waits for traffic and/or sends packets out. The unavailability interval is defined in IEEE 802.16e, and the proposed IEEE 802.16m, as a time interval that does not overlap with any listening window of any active PSC. The availability interval is defined in IEEE 802.16e, and the proposed IEEE 802.16m, as a time interval that does not overlap with any unavailability interval.

IEEE 802.16e defines the relationship between unavailability intervals and availability intervals, but does not discuss how to manage those intervals to optimize the unavailability of the device. Further, the actual definitions of multiple power saving classes may involve significant complexity in achieving efficient power savings.

The disclosed embodiments are directed to overcoming one or more of the problems set forth above.

SUMMARY

In one exemplary embodiment, the present disclosure is directed to a method for forming a device power savings class for a device operable in a wireless communications network, the device including one or more of one or more Type 1 connections, one or more Type 2 connections, and one or more Type 3 connections, comprising: defining one or more enhanced power savings classes including one or more of: defining for the device a virtual enhanced Type 1 power savings class from the Type 1 connections, if one or more Type 1 connections are active on the device; defining for the device a virtual enhanced Type 2 power savings class from the Type 2 connections, if one or more Type 2 connections are active on the device; and defining for the device a virtual enhanced Type 3 power savings class from the Type 3 connections, if one or more Type 3 connections are active on the device; and combining the Type 1 connections, if present on the device, the Type 2 connections, if present on the device, and the Type 3 connections, if present on the device, into the device power savings class for the device, based on the definitions of the virtual enhanced Type 1 power savings class, Type 2 power savings class, and Type 3 power savings class, if any are present on the device.

In another exemplary embodiment, the present disclosure is directed to a wireless communication mobile station for wireless communication, the wireless communication mobile station configured for one or more of one or more Type 1 connections, one or more Type 2 connections, and one or more Type 3 connections, the wireless communication mobile station comprising: at least one memory to store data and instructions; and at least one processor configured to access the memory and execute instructions. The processor is configured to, when executing the instructions: define one or more enhanced power savings classes including one or more of: define for the device a virtual enhanced Type 1 power savings class from the Type 1 connections, if one or more Type 1 connections are active on the device; define for the device a virtual enhanced Type 2 power savings class from the Type 2 connections, if one or more Type 2 connections are active on the device; and define for the device a virtual enhanced Type 3 power savings class from the Type 3 connections, if one or more Type 3 connections are active on the device; and combine the Type 1 connections, if present on the device, the Type 2 connections, if present on the device, and the Type 3 connections, if present on the device, into the device power savings class for the device, based on the definitions of the virtual enhanced Type 1 power savings class, Type 2 power savings class, and Type 3 power savings class, if any are present on the device.

In a further exemplary embodiment, the present disclosure is directed to a method for a device in a wireless communication network including a base station. The method may include sending a sleep mode request to the base station; and receiving a sleep mode response including negotiating parameters from the base station. The method also includes entering a sleep mode determined by a single power saving class applicable to all traffic conditions between the device and the base station; and communicating with the base station based on the sleep mode. Further, the single power saving class is used to define a frame structure for configuring frames to form alternating listening windows and sleep windows, to define an initial sleep window, and to define a default listening window.

DETAILED DESCRIPTION

Figure 1:
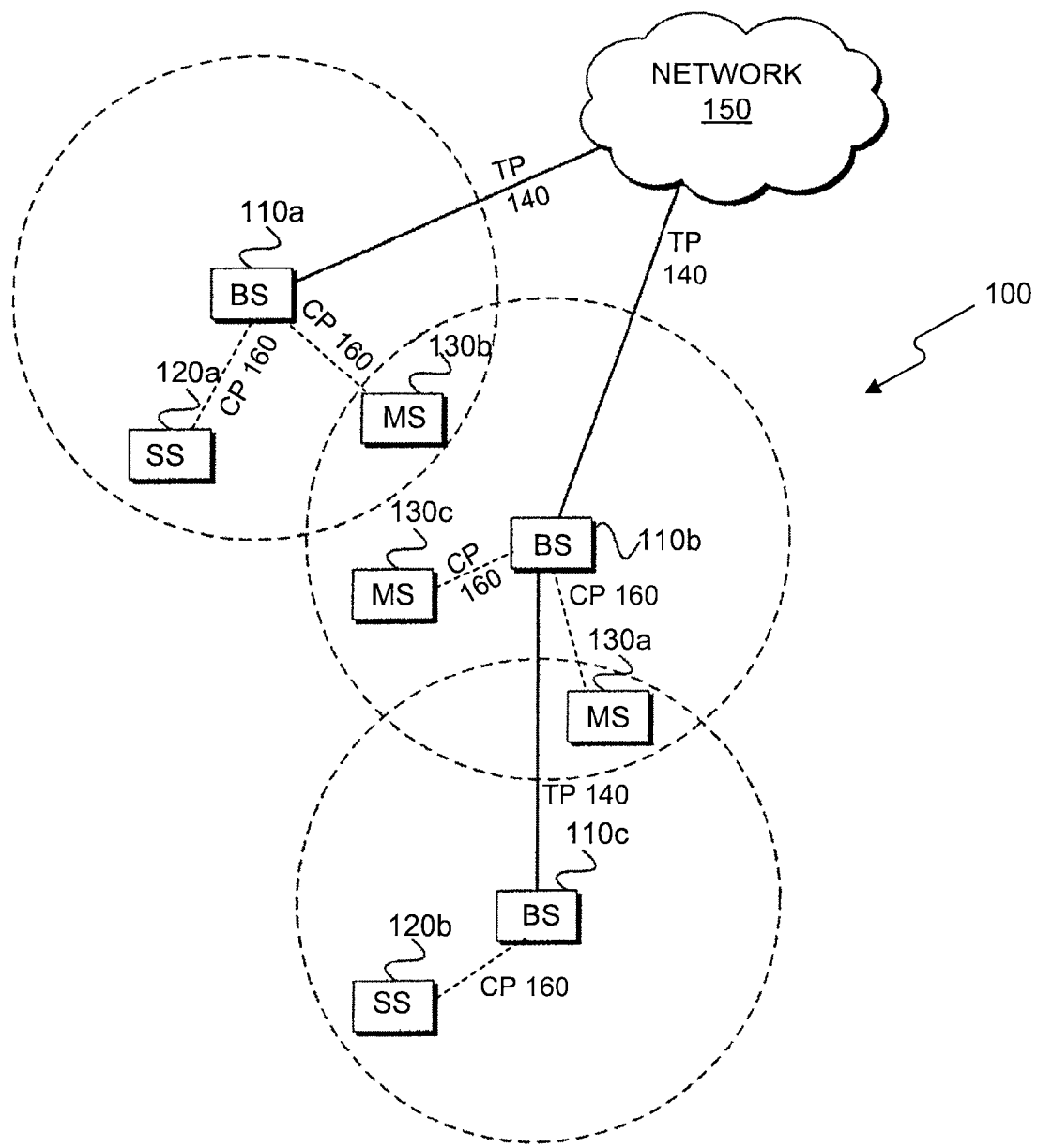
FIG. 1 is a block diagram of an exemplary WiMAX network.

FIG. 1 is a block diagram of an exemplary WiMAX network 100 based on the IEEE 802.16 family of standards including other similar standards, consistent with certain disclosed embodiments. As shown in FIG. 1, WiMAX network 100 may include one or more transmitters, e.g., base stations (BS) 110, including BSs 110a, 110b, and 110c, one or more receivers, e.g., stationary stations (SS) 120, including SSs

120a and 120b, and mobile stations (MS) 130, including MSs 130a, 130b, and 130c. While the discussion of FIG. 1 will be made with reference to the IEEE 802.16 family of standards, it is to be understood that the systems and methods disclosed herein may be used in any type of network having a plurality of nodes and remote communication stations.

The one or more BSs 110 may include any type of communication device configured to transmit and/or receive communications based on the IEEE 802.16 family of standards, many of which are known in the art. In one exemplary embodiment, the one or more BSs 110 are connected by transmission paths 140 (TP) to a network 150. In addition, BSs 110 may be configured to communicate with one or more SSs 120, MSs 130, and/or other BSs 110 using communication protocols on communication paths 160 (CP) also defined by the 802.16 family of standards. In one exemplary embodiment, BSs 110 serves as an intermediary between one or more SSs 120, MSs 130, or BSs 110 and network 150. Communication with network 150 may be made via wired connections, wireless connections, or any combination thereof. Network 150 can include, for example, any combination of one or more WANs, LANs, intranets, extranets, Internet, etc.

SSs 120 and MSs 130 may include any type of wireless client device configured to communicate with BS 110 and/or other SSs 120 and MSs 130 using the communication protocols on CP 160 defined by the 802.16 family of standards. Each SS 120 and MS 130 may include, for example, servers, clients, mainframes, desktop computers, laptop computers, network computers, workstations, personal digital assistants (PDA), tablet PCs, scanners, telephony devices, pagers, cameras, musical devices, etc. In one exemplary embodiment, SS 120 is a Wi-Fi device enabled to communicate with BS 110 using the communication protocols on CP 160 defined by the 802.16 family of standards.

Each BS 110 has a broadcast range within which that BS 110 can communicate with SS 120, MS 130, and one or more other BSs 110. Broadcast ranges of each BS 110 may vary due to power levels, location, interference (physical and/or electromagnetic), etc. Similarly, each SS 120 and MS 130 has a broadcast range within which that SS 120 and MS 130 may communicate with one or more other SSs 120, MSs 130 and/or BSs 110. Broadcast ranges of each SS 120 and MS 130 may vary due to power levels, location, interference (physical and/or electromagnetic), etc. In addition to the ability of each BS 110 to connect and communicate with SS 120 and MS 130, each BS 110 may also connect and communicate with one or more other BSs 110 using a line-of-sight, wireless link using the protocols and standards defined by the IEEE 802.16 family of standards.

TP 140 is a transmission path that may include one or more nodes in network 100. TP 140 may be wired, wireless, or any combination of wired and/or wireless communication means and/or methods.

Still referring to FIG. 1, BS 110 may be configured to create and store one or more data structures associated with one or more SSs 120, MSs 130, TPs 140, and/or one or more CPs 160, as well as to create and store one or more relationships between the data structures. For example, BS 110 may store one or more subscriber or mobile station identifiers, one or more transmission path identifiers, one or more communication path data structures, one or more transmission path data structures, etc.

In addition, MS 130 may be configured to create and store one or more data structures associated with one or more BSs 110, SSs 120, MSs 130, TPs 140, and/or one or more CPs 160, as well as to create and store one or more relationships between the data structures. For example, MS 130 may store data on one or more of: all known connections, a period of threshold communication activity, power savings classes, one or more subscriber or mobile station identifiers, one or more transmission path identifiers, one or more communication path data structures, one or more transmission path data structures, etc.

Figure 2A:
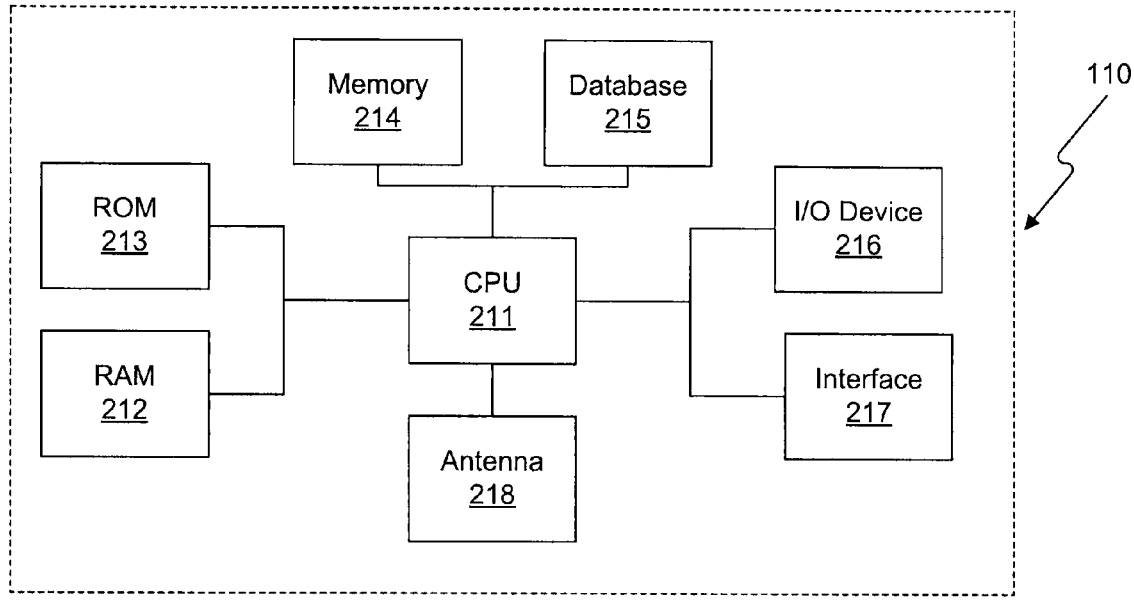
FIG. 2a is a block diagram of an exemplary base station, consistent with certain disclosed embodiments.

FIG. 2a is a block diagram of an exemplary structure of BS 110. As shown in FIG. 2a, BS 110 may include one or more of the following components: at least one central processing unit (CPU) 211 configured to execute computer program instructions to perform various processes and methods, random access memory (RAM) 212 and read only memory (ROM) 213 configured to store information and computer program instructions, memory 214 to store data and information, one or more databases 215 to store tables, lists, or other data structures, one or more input/output (I/O) devices 216, one or more interfaces 217, one or more antennas 218, etc. Each of these components is well-known in the art and will not be discussed further.

Figure 2B:
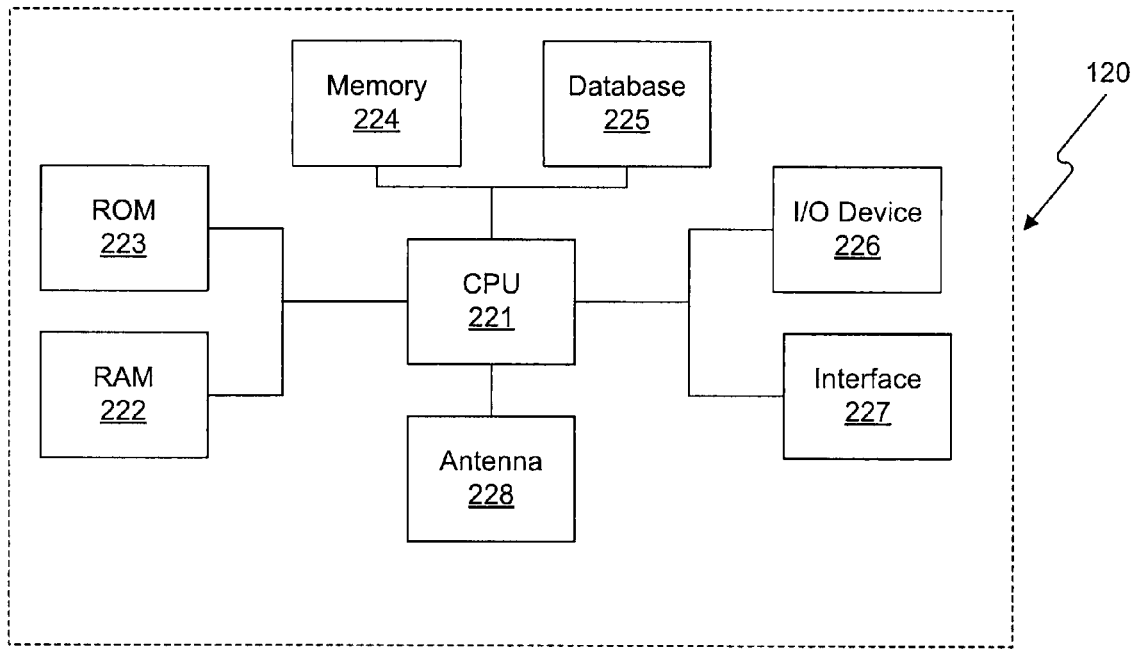
FIG. 2b is a block diagram of an exemplary stationary station, consistent with certain disclosed embodiments.

FIG. 2b is a block diagram of an exemplary structure of SS 120. As shown in FIG. 2b, SS 120 may include one or more of the following components: at least one CPU 221 configured to execute computer program instructions to perform various processes and methods, RAM 222 and ROM 223 configured to store information and computer program instructions, memory 224 to store data and information, one or more databases 225 to store tables, lists, or other data structures, one or more I/O devices 226, one or more interfaces 227, one or more antennas 228, etc. Each of these components is well-known in the art and will not be discussed further.

SS 120 may include any type of wireless client device configured to communicate with BSs 110, other SSs 120, and/or MSs 130 using one or more wireless communication standards including, for example, the IEEE 802.16 family of standards. SSs 120 may include, for example, servers, clients, mainframes, desktop computers, laptop computers, network computers, workstations, tablet PCs, scanners, telephony devices, pagers, cameras, musical devices, etc. The location of SS 120 is stationary and SS 120 is expected to remain in contact with the same group of BSs 110 and SSs 120.

Figure 2C:
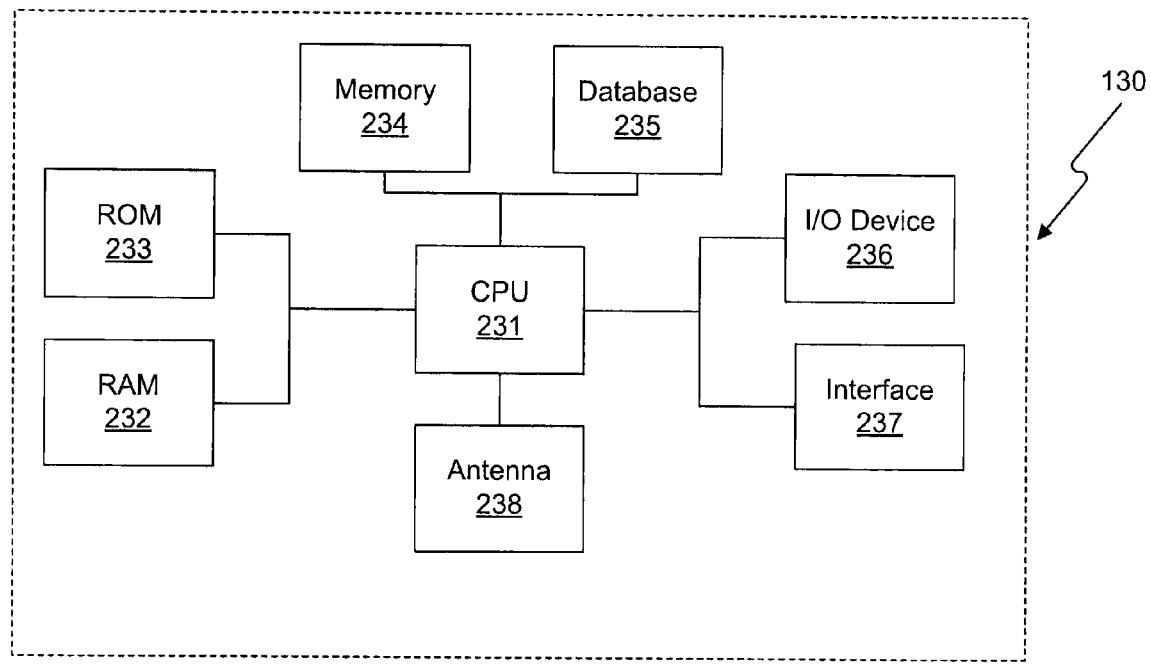
FIG. 2c is a block diagram of an exemplary mobile station, consistent with certain disclosed embodiments.

FIG. 2c is a block diagram of an exemplary structure of MS 130. As shown in FIG. 2c, MS 130 may include one or more of the following components: at least one CPU 231 configured to execute computer program instructions to perform various processes and methods, RAM 232 and ROM 233 configured to store information and computer program instructions, memory 234 to store data and information, one or more databases 235 to store tables, lists, or other data structures, one or more I/O devices 236, one or more interfaces 237, one or more antennas 238, etc. Each of these components is well-known in the art and will not be discussed further.

MS 130 may include any type of wireless client device configured to communicate with BSs 110, SSs 120, and/or other MSs 130 using one or more wireless communication standards including, for example, the IEEE 802.16 family of standards. MSs 130 may include, for example, servers, clients, mainframes, desktop computers, laptop computers, network computers, workstations, personal digital assistants (PDA), tablet PCs, scanners, telephony devices, pagers, cameras, musical devices, etc. In one exemplary embodiment, MS 130 is a mobile computing device. In other embodiments, MS 130 is a "non-mobile" computing device located in a mobile environment (e.g., airplanes, watercraft, buses, multi-passenger vehicles, automobiles, etc.).

Figure 3:
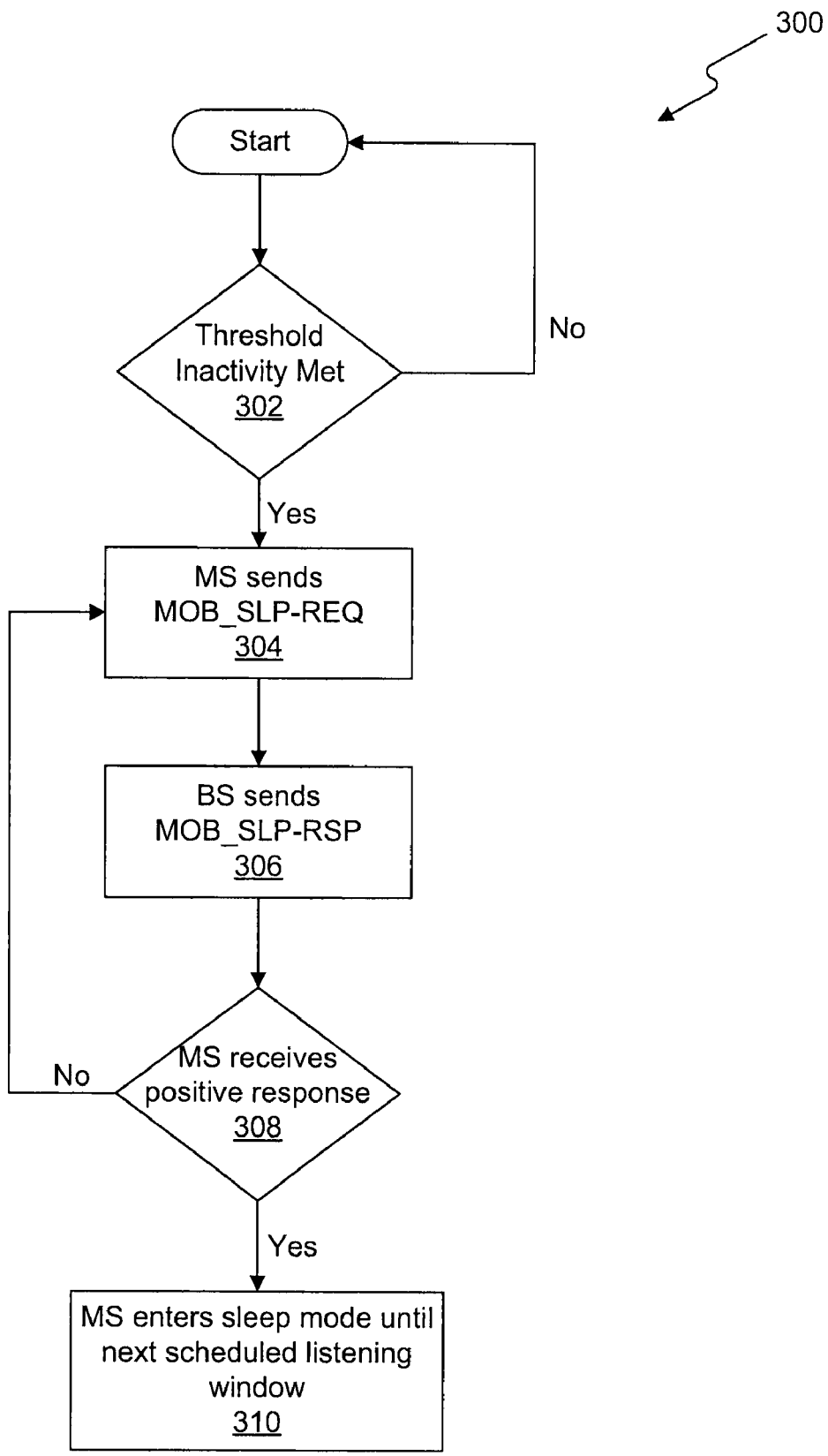
FIG. 3 is a flow chart illustrating an exemplary power saving mode request, consistent with certain disclosed embodiments.

FIG. 3 is a flow chart 300 of an exemplary conventional power saving mode request consistent with IEEE 802.16e, and the proposed IEEE 802.16m. With reference to flow chart 300, MS 130 monitors a threshold communications inactivity period and determines if a prerequisite period of threshold communication inactivity has been met (302). If the prerequisite period of threshold communication inactivity has not been met, MS 130 waits for a duration, and then monitors again. After the prerequisite period of threshold communication inactivity has exceeded its threshold, MS 130 sends a mobile station sleep request MOB_SLP-REQ to BS 110 to negotiate a sleep window (304). The MOB_SLP-REQ contains information from MS 130 necessary to implement power savings. BS 110 responds with a mobile station sleep response MOB_SLP-RSP including its response to the request to negotiate a sleep window from MS 130 (306) Various parameters, such as negotiating parameters and/or other control parameters may be included in the response. MS 130 determines if the response to its sleep window request was proper and positive (308). If the response was not proper and positive, MS 130 returns to 304. If the response was proper and positive, MS 130 enters a power savings mode at an appropriate time in accordance with the received sleep response (310).

In one exemplary embodiment, a power savings mode may include alternating sleep windows and listening windows, e.g., a communication channel (e.g., a frame structure) between MS 130 and BS 110 may include a series of patterns each includes a listening window followed by a sleep window or a sleep window followed by a listening window. During the sleep window, MS 130 cuts off all contact with its serving BS 110 and conserves its power, or uses its power for other tasks. During the listening window, MS 130 actively waits for traffic and/or sends out packets.

The power saving mode has several PSCs. In one exemplary embodiment, the above noted three PSCs of IEEE 802.16e are configured as follows. In a Type 1 PSC, sleep windows increase in size at each sleep window by doubling the previous sleep window as long as there is no incoming data, until a determined maximum duration sleep window size is reached at which the sleep window size remains unchanged. If there is incoming data, the next sleep window will be the length of the first sleep window. The listening window may be maintained at a fixed duration. A Type 2 PSC has sleep and listening windows of fixed duration. Type 2 PSCs are composed primarily of UGS, ERT-VR, and RT-VR connections. A Type 3 PSC has its sleep window duration set based on the expected arrival of a next portion of data or next expected ranging request. Periodically a ranging request may be used to determine the distance between a MS 130 and any BS 110 within range of MS 130. Ranging and ranging requests are well known in the art and will not be further discussed.

A connection is a unidirectional mapping between BS 110 and SS 120 or MS 130 for the purpose of transmitting or receiving communication traffic or data traffic. All traffic is carried on a connection, even for traffic that uses connection-less protocols, such as Internet Protocol (IP). A PSC is a group of connections that have common demand properties. For example, all BE and NRT-VR connections may be marked as belonging to a single PSC, while two UGS connections may belong to two different PSCs in case they have different intervals between consequent allocations. PSCs may be repeatedly activated and deactivated. An activation of a certain PSC means starting a sleep/listening window sequence associated with that PSC.

In the proposed IEEE 802.16m, a device PSC (PSC-D) maybe formed from all the connections associated with a device. The connections may be sorted by connection Type, that is, Type 1 connections, Type 2 connections, and Type 3 connections. A Type 1 connection corresponds to a connection that would be used to form a Type 1 PSC. A Type 2 connection corresponds to a connection that would be used to form a Type 2 PSC. A Type 3 connection corresponds to a connection that would be used to form a Type 3 PSC. It is understood that, although specific types of connections are used to illustrate different traffic conditions and/or configurations of frames of data to and from MS 130, these traffic conditions and/or configurations of frames may be directly used instead of or in addition to the types of connections. That is, a type of connection may be equivalent to one or more traffic conditions and/or configurations of the frames communicating between MS 130 and BS 110. A traffic condition, as used herein, may refer to a specific kind of data flow, such as a non-real-time data flow, a real-time data flow, a signaling data flow, and/or a management or other protocol data flow. Other kinds of data flows may also be included.

PSC listening windows, sleep windows, availability intervals, and unavailability intervals, each have a duration, which is a measurement in time. In one exemplary embodiment, the measurement in time is a frame. A frame in one exemplary embodiment may have a duration between 2 milliseconds and 20 milliseconds. In other exemplary embodiments, a frame may be a shorter or a longer duration. A superframe is composed of several frames. A superframe contains a superframe header. A superframe header may contain information from BS 110 to MS 130 about routing, window durations, expected traffic, etc. As used below, length, when referring to a PSC listening window, sleep window, availability interval, and unavailability interval, is referring to the duration in time, not to a physical measurement of distance.

Figure 4:
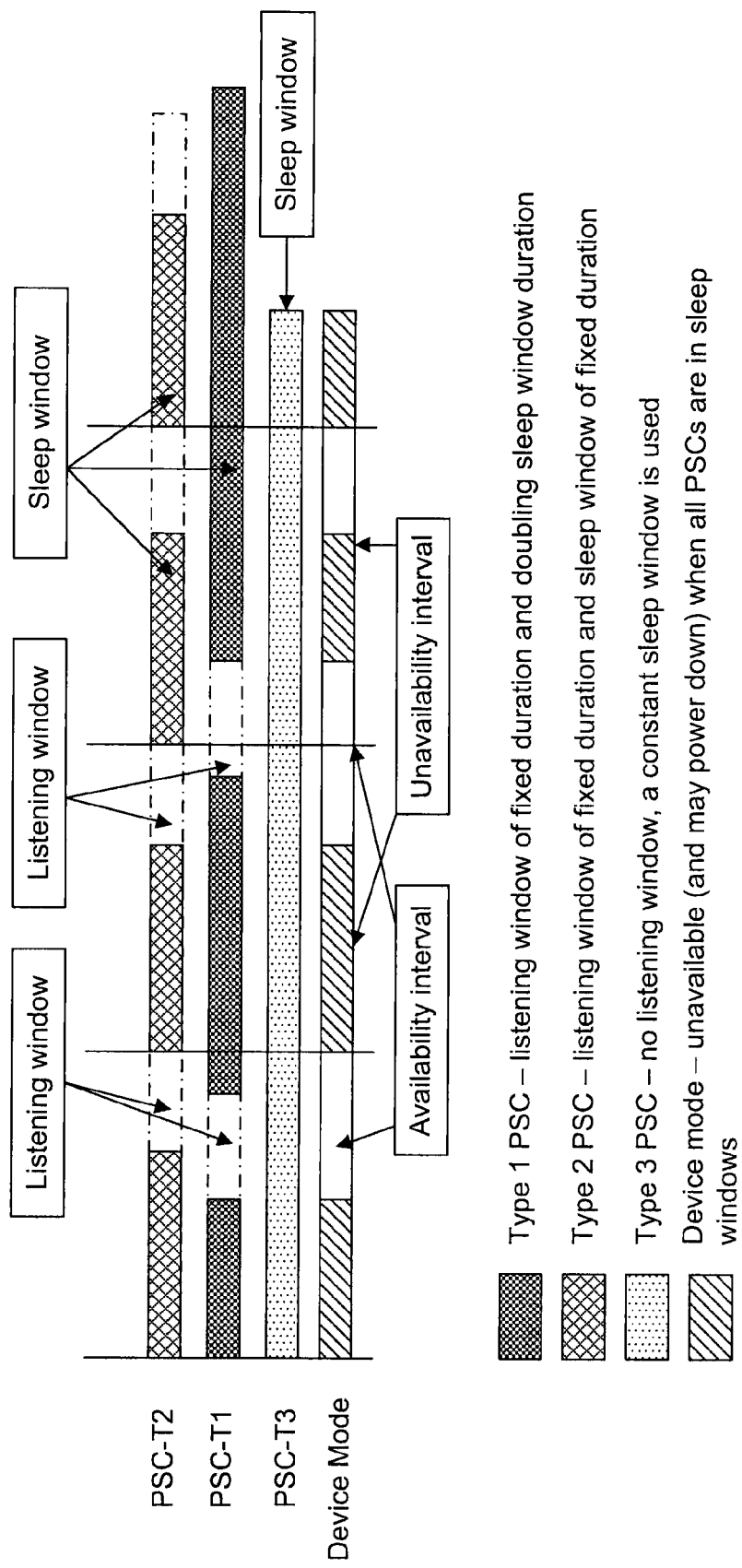
FIG. 4 is an exemplary diagram including a horizontal time axis, illustrating availability and unavailability intervals of a mobile device based on sleep and listening windows of multiple PSCs, consistent with certain disclosed embodiments.

FIG. 4 is an exemplary diagram including a horizontal time axis, illustrating availability and unavailability intervals of a mobile device, e.g., MS 130, based on sleep and listening windows of multiple PSCs. More particularly, FIG. 4 shows an example of a conventional alignment in which one PSC of each class is aligned. PSC-T2 (Power Savings Class—Type 2) may have alternating sleep and listening windows of fixed length. PSC-T1 (Power Savings Class—Type 1) is a Type 1 PSC, and PSC-T1 may also have alternating sleep and listening windows, where the sleep window is twice the length of the previous sleep window, to a fixed maximum. PSC-T3 (Power Savings Class—Type 3) is a Type 3 PSC, and may have its sleep window duration set based on the expected arrival of the next portion of data or next expected ranging request.

As shown in FIG. 4, MS 130 may have a device mode, as long as the PSCs are active, corresponding to the availability interval and unavailability interval. The device mode is set to unavailable when all of the PSCs' windows are set to sleep. When one or more of the PSCs are in a listening window, the device mode will be set to available. As the number of PSCs increases, the unavailability intervals may be shorter and less evenly spaced. Additionally, as the number of PSCs increases, the signaling burden between BS 110 and MS 130 increases.

As used herein, a PSC-D is a single PSC formed from multiple connection types. PSC-D is the only PSC present on the device, in this example MS 130, and PSC-D will also be the device mode. That is, a single power saving class PSC-D is used for all traffic conditions for MS 130. In contrast, a device mode may be any combination of connections or PSCs that may initially be present on the device, such PSCs being referred to herein as operational PSCs, and does not have to be a single PSC, such as the PSC-D. The creation of the PSC-D can reduce the power consumption of the device, and the use of timers on the device may reduce the signaling overhead created by the device when in sleep mode.

The following disclosure provides an exemplary method of forming a PSC-D from any combination of operational Type 1 connections, Type 2 connections, and Type 3 connections. The method provides a way to define enhanced PSCs of all the connections in a Type. An enhanced Type 1 PSC (ePSC-T1) is formed of all Type 1 connections on a device, if any Type 1 connections are present on the device. An enhanced Type 2 PSC (ePSC-T2) is formed of all Type 2 connections on a device, if any Type 2 connections are present on the device. An enhanced Type 3 PSC (ePSC-T3) is formed of all Type 3 connections on a device, if any Type 3 connections are present on the device All the connections may then be combined into the PSC-D structured off the ePSC-T2, if the ePSC-T2 is available. If only one Type of connection Type is present, that enhanced PSC is used as the PSC-D. Otherwise, the PSC-D will be structured off the ePSC-T3 sleep window if a combination of Type 1 connections and Type 3 connections are present, unless the Type 3 connection sleep window is longer than the buffer capacity of BS 110 for Type 1 connection traffic.

Figure 5:
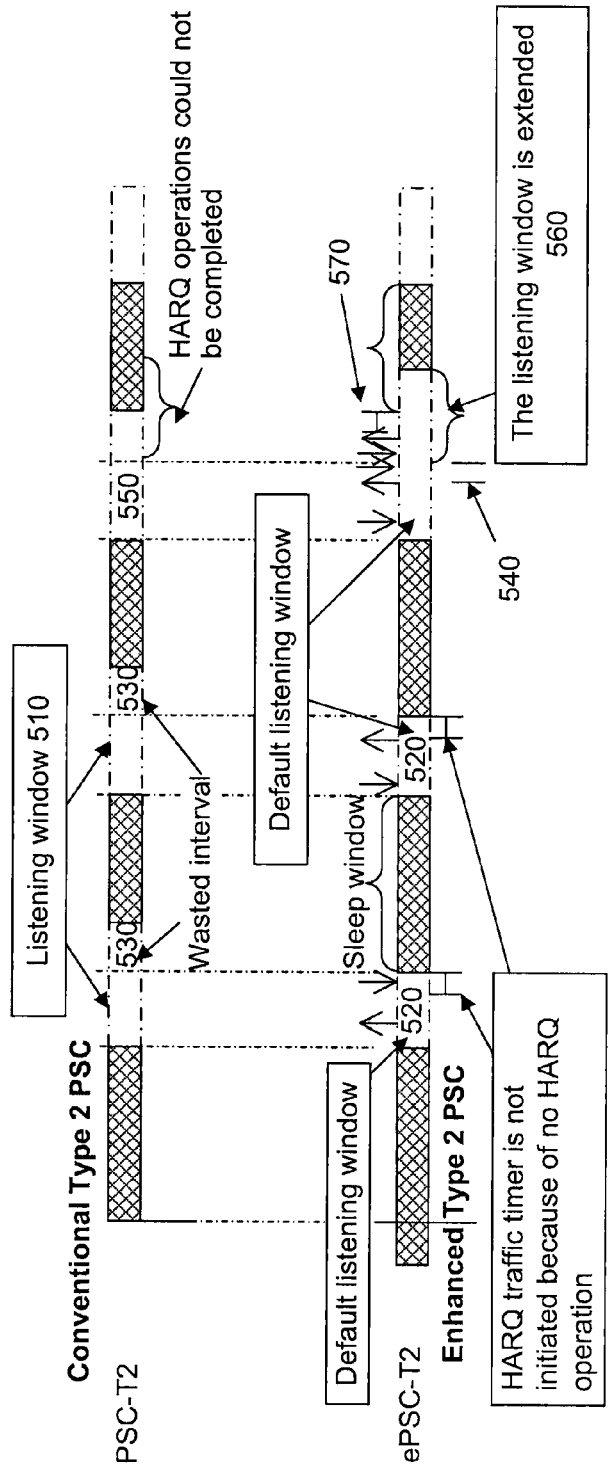
FIG. 5 is an exemplary diagram including a horizontal time axis, illustrating availability and unavailability intervals of a mobile device based on sleep and listening windows of both an operational Type 2 PSC and an ePSC-T2 with timers, consistent with certain disclosed embodiments.

FIG. 5 is an exemplary diagram including a horizontal time axis, illustrating availability and unavailability intervals of a mobile device, e.g., MS 130, based on sleep and listening windows of both an operational Type 2 PSC and an ePSC-T2 with timers. As discussed above, a Type 2 PSC has fixed length listening windows alternating with fixed length sleep windows. More particularly, FIG. 5 shows how the operational Type 2 PSC may use a listening window that is longer than required for error free communication. As used herein, error free communication is a communication, whether transmission or reception, or both, that was received without requiring a retransmission. Additionally, in some cases for the operational Type 2 PSC, transmissions and receptions between MS 130 and BS 110 during HARQ (Hybrid Automatic Repeat ReQuest) operations may not be completed in the listening window. Either the listening window must be made long enough to accommodate the worst case HARQ operations requirement, or not all HARQ operations will be completed in the listening window. If the listening window is extended to accommodate the worst case HARQ operation, when the communication is error free, the listening window is longer than needed to complete the communication. The extra length of the listening window is wasted power use, reflecting a trade off between ensuring an opportunity to retransmit an incorrect communication and power consumed in a longer listening window and a possibly longer availability interval.

In the exemplary embodiment shown in FIG. 5, ePSC-T2 has a default listening window. The default listening window may be set with a duration equal to an error free communication. An actual listening window may have a duration of the default listening window or may be extendable For example, the HARQ traffic timer starts with a retransmission of data and runs for the return time for an ACK/NAK from BS 110 as a result of the retransmission during HARQ operations. If an ACK is received, the HARQ traffic timer may expire normally, and the default listening window terminates. If the HARQ traffic timer expires without receiving an ACK, or a NAK is received, the HARQ traffic timer expires abnormally. If the HARQ traffic timer expires abnormally, the default listening window will be extended to allow a retransmission of the data. The HARQ traffic timer is used to manage extending the listening window of the PSC, and not to manage the actual HARQ operations. The HARQ traffic timer may continue to expire abnormally until the HARQ operations are completed successfully.

As can be seen in FIG. 5, listening windows 510 of PSC-T2 and default listening windows 520 of ePSC-T2 may start at the same time. Listening window 510 may be longer than default listening window 520. The difference is wasted listening window 530, where if the communication was error free, the communication would have been completed, and the PSC could have returned to sleep mode earlier than it did in the operational PSC-T2. Additionally, the third listening window/third default listening window represents a case in which the communication was not error free, and the HARQ traffic timer did not expire normally (540). The operational PSC-T2 may automatically start its next sleep window, even though the period required to complete the HARQ retransmission and ACK/NAK was not finished (550). In other cases, the PSC-T2 listening window may be long enough to complete the retransmission and receive an ACK/NAK. The ePSC-T2 extends default listening window 560 if the HARQ traffic timer expires abnormally (540) to allow the retransmission of data. The HARQ traffic timer is restarted, and if it expires normally (570), the next sleep window may begin.

The use of the shorter default listening window and the HARQ traffic timer in the ePSC-T2 may increase the overall percentage of time the Type 2 PSC is in a sleep window, increasing power savings. Additionally, by using the HARQ traffic timer, the ePSC-T2 can adaptively respond to communication issues and increase the duration of the default listening window. The adaptive response may increase power consumption, but when all operations are being completed normally, the use of shorter default listening windows leads to a power savings.

Figure 6:
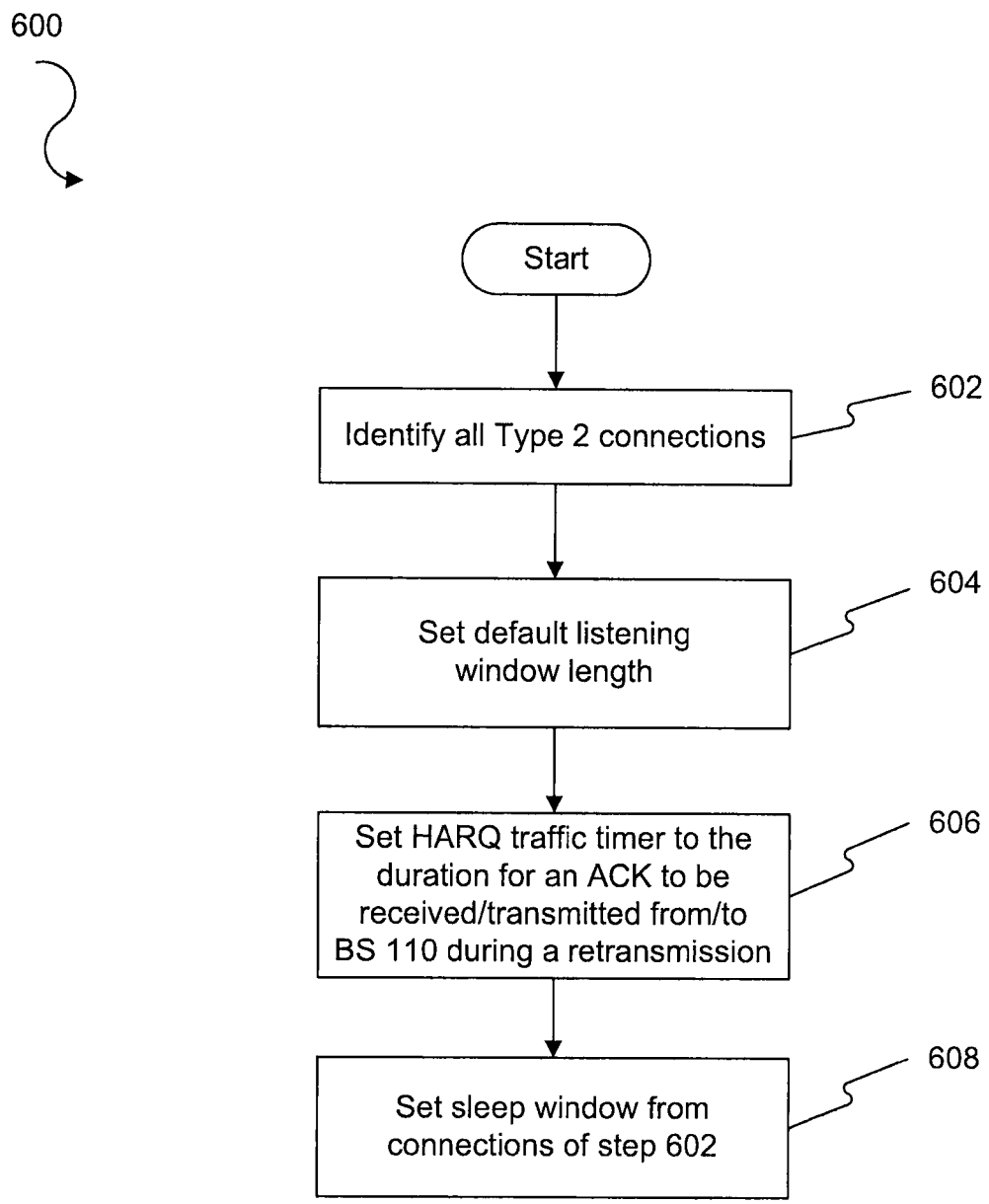
FIG. 6 is a flow chart illustrating an exemplary method to assemble an ePSC-T2, consistent with certain disclosed embodiments.

FIG. 6 shows a flow chart 600 illustrating an exemplary embodiment of a method to assemble an ePSC-T2. Assembly of an ePSC-T2 is used to combine all Type 2 connections into one ePSC-T2. With reference to FIG. 6, first, all the Type 2 connections are identified, and the constraints for the Type 2 connections are identified (602). The ePSC-T2 default listening window, the HARQ traffic timer, and the sleep window will be set based on the constraints of the Type 2 connections. Other types of connections or configuration, however, may also be used.

Next, the default listening window length of the ePSC-T2 is set (604). Illustrative criteria to set the duration of the default listening window include using the average of the required active period (listening windows), or the longest required active period of all the Type 2 connections being combined into the ePSC-T2. In an alternate illustrative example, the default listening window may be set to an average of the time for an error free communication for each Type 2 connection, or the longest duration required for an error free communication by a Type 2 connection.

Next, the HARQ traffic timer is set to the length required for an ACK or NAK to be received by MS 130 from BS 110 or by BS 110 from MS 130 (606) during a data retransmission. The HARQ traffic timer is used to extend the default listening window when an ACK is not received after a retransmission. If at the expiration of the HARQ traffic timer, an ACK has not been received, the HARQ traffic timer expires abnormally, and the HARQ traffic timer may be restarted. If the HARQ traffic timer is restarted, the default listening window may be extended (See FIG. 5). The HARQ traffic timer may continue to be reset until the data is sent successfully, or the maximum number of HARQ retries has been met. Extending the default listening window into the sleep window does not shift the sleep window, the sleep window will end when scheduled to end, and the duration of the sleep window will be reduced by the same amount as the extension of the default listening window. If the HARQ traffic timer extends the listening window into the next listening window, the HARQ operations may continue if resources are available, otherwise the HARQ operations will be interrupted.

Next, the sleep window length of the ePSC-T2 is set to a time based on the identified constraints in 602 (608). Illustrative criteria to set the duration of the sleep window include using the average of the required sleep windows of the Type 2 connections, or the longest required sleep window of all the Type 2 connections being combined into the ePSC-T2.

The ePSC-T2 assembled in flow chart 600 may reduce the listening windows collectively of all Type 2 connections on a device, if all the transmissions were successful on the first try, otherwise HARQ traffic timer may extend the default listening window into the next sleep window. The ePSC-T2 may also provide a single Type 2 PSC, regardless of the number of Type 2 connections, and remove any issue with overlap of listening and sleep windows found in an alignment of Type 2 PSCs.

Figure 7:
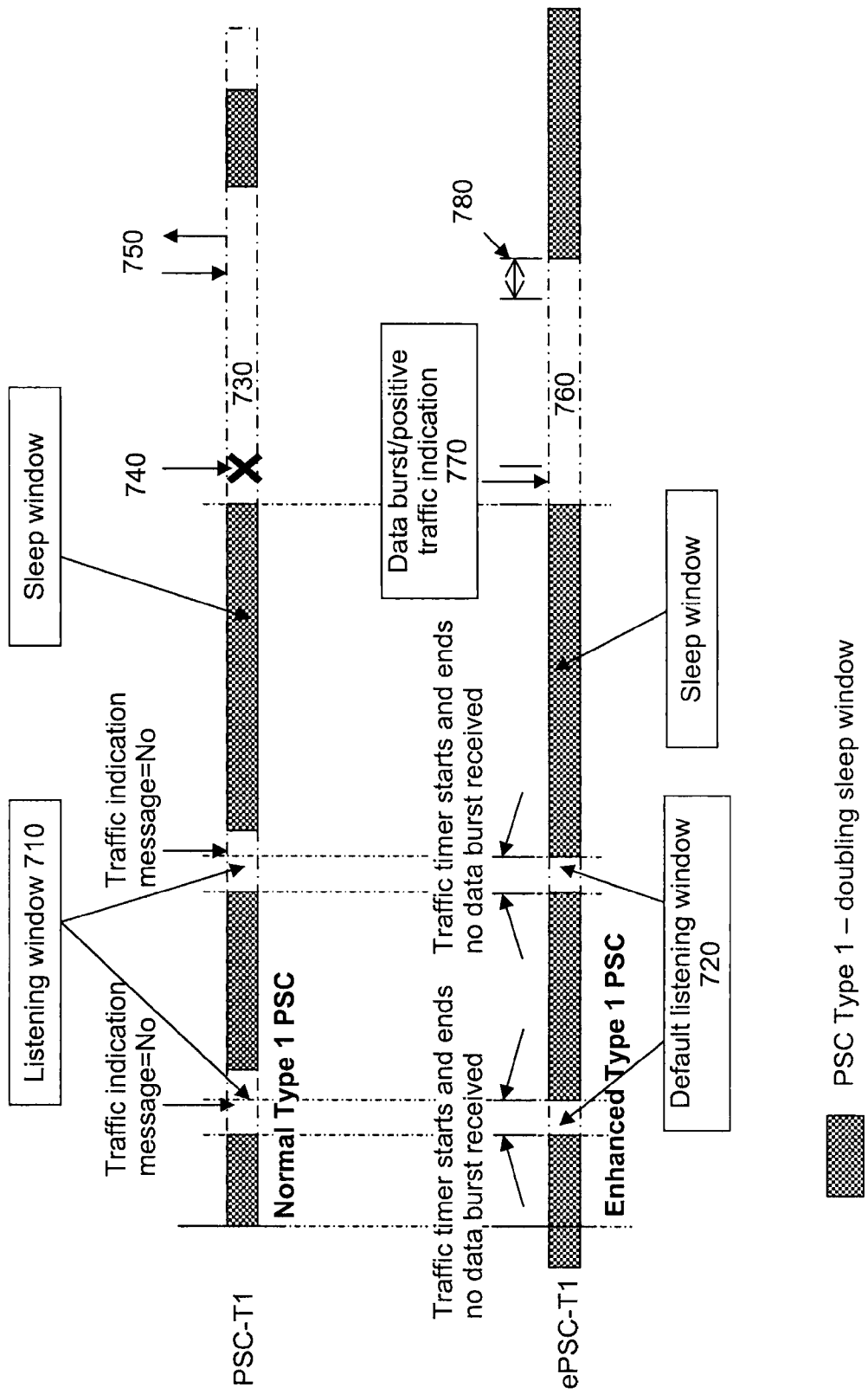
FIG. 7 is an exemplary diagram including a horizontal time axis, illustrating availability and unavailability intervals of a mobile device based on sleep and listening windows of both an operational Type 1 PSC and an ePSC-T1 with timers, consistent with certain disclosed embodiments.

FIG. 7 is an exemplary diagram including a horizontal time axis, illustrating availability and unavailability intervals of a mobile device, e.g., MS 130, based on sleep and listening windows of both an operational Type 1 PSC and an ePSC-T1 with timers. As discussed above, a Type 1 PSC has a listening window of fixed duration and a sleep window that doubles after each listening window, up to some fixed maximum duration. If there is incoming data, the next sleep window will be the length of the first sleep window. More particularly, FIG. 7 shows how the operational Type 1 PSC may use a listening window that is longer than required when no traffic is to be received, that is, the traffic indication message equals "No." In this case, MS 130 wastes power waiting for a signal from BS 110 that a data burst may be sent. If the traffic indication signal is received and positive, MS 130 deactivates the PSC-T1 and becomes active to receive the data burst. After the data burst is completed, MS 130 and BS 110 will signal back and forth to negotiate the next listening and sleep window for the operational Type 1 PSC. Once the signaling is complete, the operational Type 1 PSC will start its next sleep window. After an activation, the sleep window duration is the initial sleep window, regardless of how long the sleep window was before activation (i.e., the sleep window does not reflect actual traffic patterns).

One exemplary embodiment of ePSC-T1 is shown in FIG. 7. The ePSC-T1 has a default listening window with a duration equal to the traffic timer. If no data burst or traffic indication message is received during the default listening window, the sleep window will start. If a data burst is received before the traffic timer expires or there is a positive traffic indication, then the data burst timer is started. In one exemplary embodiment, the presence of traffic may be indicated by a positive traffic indication at a predefined location in the superframe. The traffic indication may be indicated by several bits in a specific location in the superframe. Each of these bits may represent a group of MSs 130. In a further exemplary embodiment, if the bit is set to 0 in the superframe, the group of MSs 130 may not expect any traffic, and power does not have to be used decoding the MAP. Whenever the bit representing a group of MSs 130 is set to 1, then at least one MS 130 may receive a data burst. Alternatively, an MS 130 may receive a data burst before the traffic timer expires without receiving any traffic indication for that data burst. The data burst timer is restarted at every reception of new data, until it expires without any receptions of data during the data burst timer. The data burst timer is not designed to be long enough to allow all transmissions to be completed without the data burst timer being reset. The data burst timer is the duration to be spent waiting for a data burst reception before the device decides to return to a sleep window. The data burst timer's role is to monitor incoming data burst traffic. Alternatively, BS 110 may also use signaling to define the end of a data burst and/or use signaling to define new parameters to MS 130, in which case BS 110 can send a signal to interrupt a running data burst timer, triggering MS to sleep. When the data burst timer expires, if no signals have been received by MS 130 to indicate otherwise, the next sleep window will be started. The sleep window duration after a data burst reception may be a multiple integer of the first sleep window or a new value, based on a sleep window restart procedure used as described below.

As can be seen in FIG. 7, listening windows 710 of operational PSC-T1 and default listening windows 720 of ePSC-T1 may start at the same time. Listening windows 710 may be longer than default listening windows 720. The ePSC-T1 uses the presence of several bits in a predefined location in the superframe to indicate the presence of traffic without having to necessarily decode the MAP. PSC-T1 needs a period of time to wait for the MAP to be decoded to determine if there was a traffic indication. The difference between operational PSC-T1 and ePSC-T1 is wasted listening window and the wasted power to decode the MAP. If a negative traffic indication is received at the predefined location of the superframe during default listening window 720, no data burst will be initiated, and the ePSC-T1 will return to sleep mode earlier than the operational PSC-T1 did. Additionally, a third listening window 730 of PSC-T1 represents a case in which a traffic indication message 740 is received during third listening window 730 deactivating the PSC-T1, a data burst is received, and then a message exchange 750 occurs to reactivate PSC-T1 with the same initial sleep window. Likewise, a third default listening window 760 of ePSC-T1 represents a case in which a data burst or traffic indication message 770 is received before the traffic timer expires and a data burst timer is initiated without any deactivation of ePSC-T1. When the data burst timer expires normally, or a signal is received to end the traffic and redefine parameters (780), the ePSC-T1 will start a new sleep window, determined by the sleep window restart procedure described below. The ePSC-T1 does not have to wait for the message exchange 750 between MS 130 and BS 110 before starting its next sleep window, because there is no deactivation of the ePSC-T1. The ePSC-T1 may return to sleep before the PSC-T1.

The ePSC-T1 may reduce signal load by using a traffic timer. The duration of the traffic timer may be determined by the predefined location of the traffic indication in the superframe which signals the presence of a data burst. In a case where the traffic indication message is lost, the traffic timer may also cause MS 130 to wait until the traffic timer expires before going to sleep. If in the meantime a data burst is received during the traffic timer interval, the data burst will be processed as if a positive traffic indication was received. The signaling required to determine when to return to sleep is reduced or eliminated, because there is no deactivation of the ePSC-T1. A signal of a few bits may be used to redefine one or more of the parameters related to the initial sleep window of the ePSC-T1, after a data burst reception. Additionally, since ePSC-T1 is using the traffic timer to determine if there will be incoming traffic, a data burst started before the traffic timer expires may have the same effect as BS 110 sending a positive traffic indication signal. Further, ePSC-T1 may improve power savings by not using the full listening window of an operational PSC-T1, when there is no data burst or positive traffic indication signal. In an ePSC-T1, MS 130 will look at a predetermined location of the superframe at the start of the listening window for the presence of a traffic indication.

If the traffic indication message is negative, ePSC-T1 may enter its next sleep window. Also, ePSC-T1 may improve power savings if the sleep window restart procedure uses a sleep window longer than the initial sleep window when restarting the ePSC-T1 after reception of a data burst, by reducing the number of listening windows until the next data burst or positive traffic indication signal.

Additionally, as with the ePSC-T2, a HARQ traffic timer may start with the data burst retransmission because of HARQ operations and run for the return time for an ACK/NAK from BS 110 as a result of the retransmission. The unexpired HARQ traffic timer is used to extend the default listening window when an ACK is not received after a transmission. If an ACK is received, the HARQ traffic timer may expire normally, and the default listening window terminates. If the HARQ traffic timer expires without receiving an ACK, or a NAK is received, the listening window will be extended to allow successful completion of HARQ operations. Additionally, by using the HARQ traffic timer, the ePSC-T1 can adaptively respond to communication issues and dynamically extend a listening window or enter a sleep window without the additional delay of BS 110 signaling MS 130 to return to sleep. The adaptive response may increase power consumption by following traffic patterns, but when all operations are completed normally, the use of shorter default listening windows leads to power savings.

Also, the initial sleep window after a data burst in an ePSC-T1 may be determined by the sleep window restart procedure. The next sleep window may be an integer multiple of the initial sleep window of the ePSC-T1 or any new value. The next sleep window may be based on the sleep window restart procedure. One example of the sleep window restart procedure could be to use an algorithm based on the number of sleep windows that have passed since the last initial sleep window was determined. If one or two sleep windows have passed, the next initial sleep window may be equal to the previous initial sleep window or the original initial sleep window. If three or four sleep windows have passed since the previous initial sleep window was determined, then the next initial sleep window is equal to the second sleep window. That is, the next initial sleep window is equal to twice the previous initial sleep window. If five or more sleep windows have passed since the previous initial sleep window was determined, then the next initial sleep window is equal to the third sleep window. That is, the next initial sleep window is equal to three times the previous initial sleep window. One alternative embodiment could be to set a new initial sleep window by BS 110 sending a signal with a new value to replace the previous initial sleep window.

BS 110 may change the sleep window restart procedure by sending a signal before MS 130 begins its next sleep window, defining changes in the sleep window restart procedure, or setting another initial sleep window for use. Other examples of the sleep window restart procedure include using a next initial sleep window that is half the duration of the previous initial sleep window, or using the same initial sleep window after each data burst. Additionally, the number of sleep windows that have passed since the previous initial sleep window was determined before changing the initial sleep window for the next sleep window may be varied.

Every few listening windows should overlap with the superframe header to synchronize MS 130 with BS 110 and get the system information in the SFH (SuperFrame Header). The system information may not typically change with every superframe. Having the listening window overlap with the superframe header every few listening windows may be enough to update the system parameters and configuration information of MS 130. The initial sleep window may be chosen such that it allows the system information to update during every few listening windows by when the listening window intermittently overlaps the SFH. If MS 130 detects its information is not up-to-date, then MS 130 should not transmit in the listening window until updating the system information. After the reception of a data burst, the next sleep window may be chosen either through a signal from BS 110 or implicitly, by using timers, so that a reception of the SFH might be possible as described above.

Figure 8:
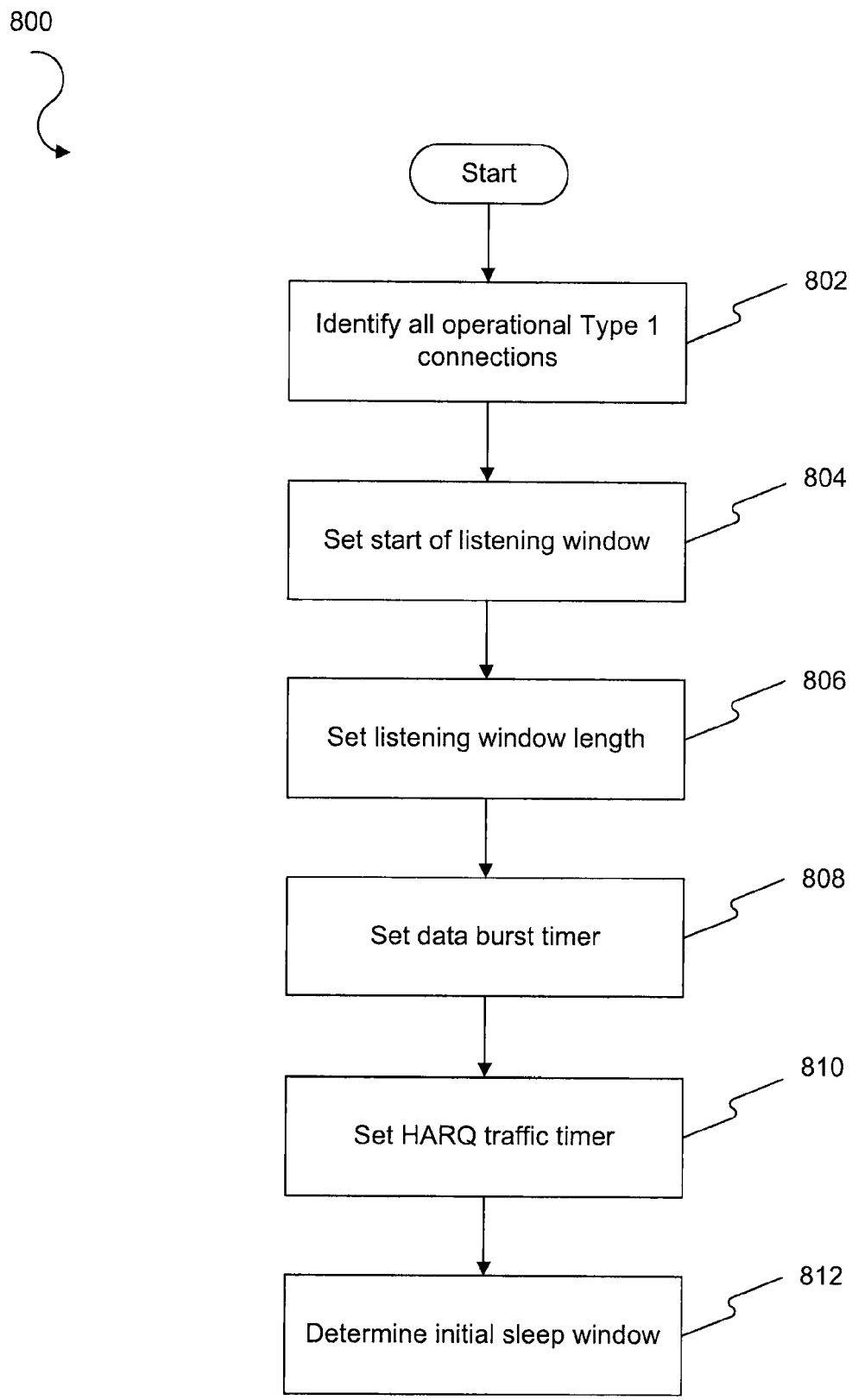
FIG. 8 is a flow chart illustrating an exemplary method to assemble an ePSC-T1, consistent with certain disclosed embodiments.

FIG. 8 shows a flow chart 800 illustrating an exemplary embodiment of a method to assemble an ePSC-T1. Assembly of an ePSC-T1 is used to combine all the Type 1 connections on a device into one ePSC-T1. With reference to FIG. 8, first all the Type 1 connections are identified (802). The ePSC-T1 initial sleep window, the duration of the data burst timer, the default listening window, and the HARQ traffic timer may be set based on the constraints of the Type 1 connections. Other types of connections or configuration, however, may also be used.

Next, the start of the default listening window of the ePSC-T1 is set to provide overlaps of the listening windows and the superframe header (804). The default listening window size, the duration of the timers, and the sleep window ends may be chosen in part to ensure that subsequent default listening windows sometimes overlap with a superframe header.

The default listening window length of the ePSC-T1 is set (806). Illustrative criteria to set the duration of the default listening window include using the traffic timer. The traffic timer is determined based on an expected time to start receiving a data burst or for a positive traffic indication to be received, i.e., traffic activity. This expected time may be in the order of few subframes as the traffic indication is at a fixed location in the superframe. If the traffic timer expires without the reception of a data burst or a positive traffic indication, ePSC-T1 may return to sleep mode. If a data burst is received before the expiration of the traffic timer or after a positive traffic indication, the data burst timer would start.

The data burst timer is set equal to the maximum expected time to receive a new data burst after the successful reception of the last data burst for the ePSC-T1 (808). The data burst timer is determined based on the time to wait for another data burst when there are no HARQ operations running. The data burst timer starts only after a complete reception of a new data burst and helps to end the listening window when there is no signal from BS 110 and there are no more data burst to be received. If the data burst timer expires without the reception of any signals from BS 110, while no HARQ traffic timer is running, ePSC-T1 may start a new initial sleep window. The duration of the initial sleep window may be determined by the sleep window restart procedure.

The HARQ traffic timer is set equal to the time required for an ACK or NAK to be received by MS 130 from BS 110 (810) or vice versa, during a data retransmission. The HARQ traffic timer is used to extend the default listening window when an ACK is not received after a retransmission. If at the expiration of the HARQ traffic timer, an ACK has not been received, the HARQ traffic timer expires abnormally, and the HARQ traffic timer may be restarted. The HARQ traffic timer may continue to be reset until the data is sent successfully, or the maximum number of HARQ retries has been met. When the HARQ traffic timer expires normally, and no new data bursts have been received, the next initial sleep window may be started.

Determine an initial sleep window (812). The initial sleep window may be selected such that after the listening window and the initial sleep window, or a multiple integer of the initial sleep window, subsequent listening windows may overlap the superframe header (for synchronization and system information update).

The ePSC-T1 assembled in flow chart 800 may improve power savings because the listening window is shorter when there is no data burst or positive traffic indication signal. Since there is no data burst from BS 110, the whole listening window is not needed. The ePSC-T1 may also provide a single Type 1 PSC, regardless of the number of Type 1 connections, and remove any issue with overlap of listening and sleep windows found in an alignment of Type 1 PSCs. Additionally, the ePSC-T1 may offer improved power savings if the sleep window restart procedure uses a sleep window longer than the initial sleep window when restarting the sleep/listening cycle after a data burst. Also, there may be additional savings from reducing the signal load by using a traffic timer instead of always waiting for a positive traffic indication (which could be lost) or always negotiating the next sleep window after a deactivation.

Figure 9:
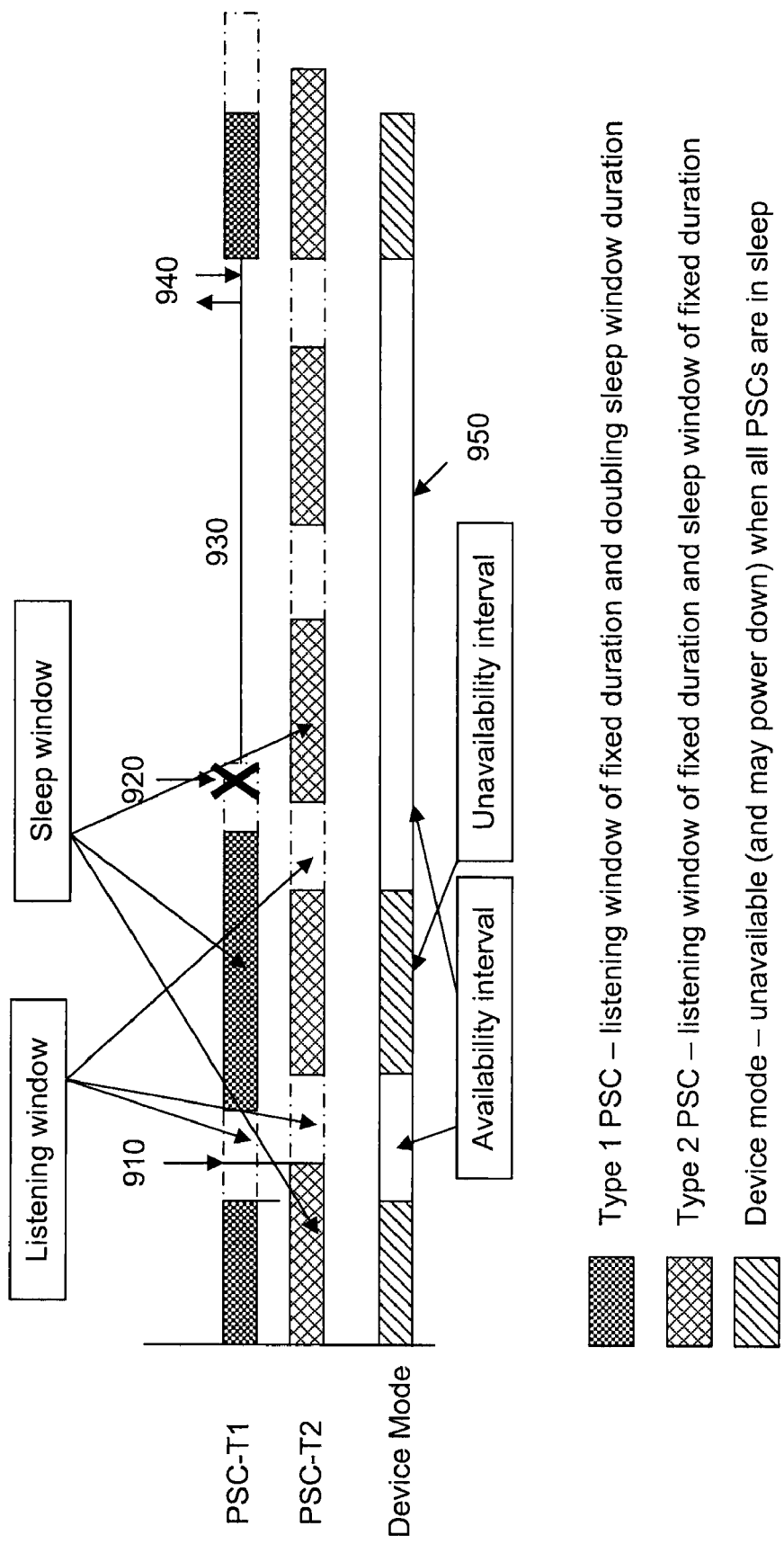
FIG. 9 is an exemplary diagram including a horizontal time axis, illustrating availability and unavailability intervals of a mobile device based on sleep and listening windows of multiple PSCs with different Types that are combined into a device mode, consistent with certain disclosed embodiments.

FIG. 9 is a diagram including a horizontal time axis, illustrating availability and unavailability intervals of a mobile device, e.g., MS 130, based on sleep and listening windows of multiple PSCs with different Types that are combined into a device mode. As shown in FIG. 9, when a Type 1 PSC and a Type 2 PSC are combined into a device mode, the unavailability windows may be reduced, or inconsistent, due to overlapping sleep and listening windows. This is especially true when the Type 1 PSC has data bursts.

As shown in FIG. 9, traffic indication="No" 910 is received during the first listening window of operational PSC-T1. No additional communication may be expected during the first listening window of PSC-T1. The part of the listening window after traffic indication="No" 910 is wasted listening window. In the second listening window of PSC-T1, traffic indication="Yes" 920 is received. Traffic indication="Yes" 920 is a positive traffic indication. Once traffic indication="Yes" 920 is received, the PSC-T1 will be deactivated and MS 130 may begin DL/UL data burst operations 930.

DL/UL data burst operations 930 may suspend the sleep/listen cycle of the Type 1 PSC. Data may be transmitted and received. Once the data burst is complete, signaling to reactivate PSC-T1 940 may occur. Signals may be sent between BS 110 and MS 130 to reactivate PSC-T1. The duration of the initial sleep window may be specified, as well as the duration of the listening window.

The device mode may be in an unavailability window when all PSCs are in a sleep window. Also, the device mode may be in an availability window when one or more PSCs is in a listening window, or performing operations. An example of the Type 1 traffic preventing the device mode from entering an unavailability window is shown at 950. Minimizing the time when the Type 1 traffic prevents the device mode from being unavailable may reduce power usage on the device.

Figure 10:
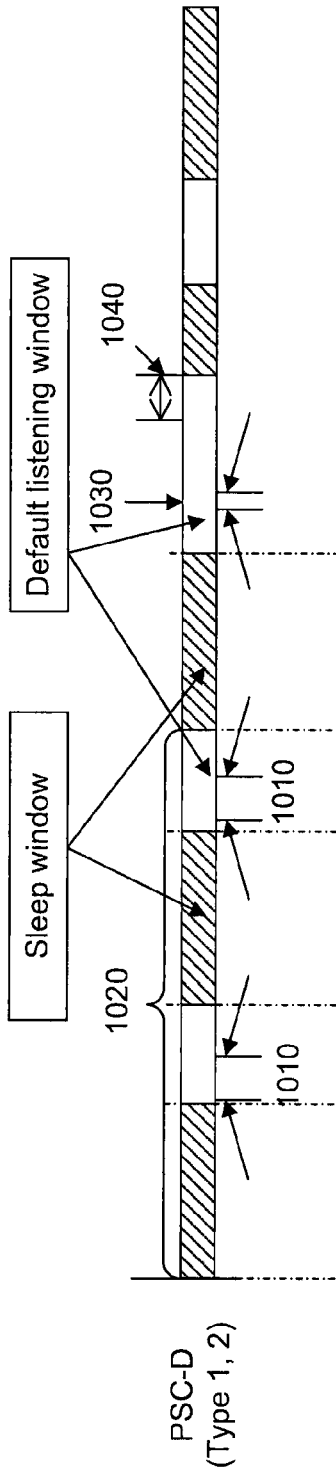
FIG. 10 is an exemplary diagram including a horizontal time axis, illustrating availability and unavailability intervals of a mobile device based on sleep and listening windows of multiple connections of different Types that are combined into a PSC-D, consistent with certain disclosed embodiments.
Figure 10:
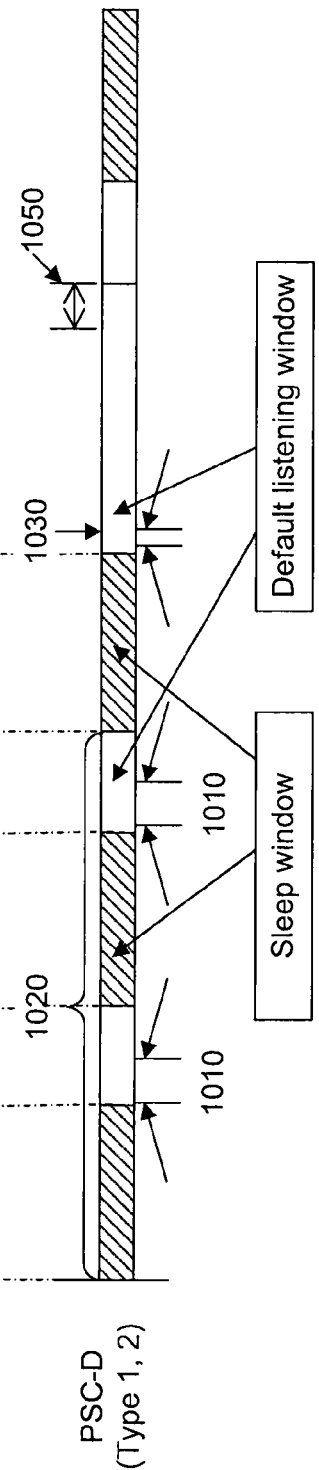

FIG. 10 is an exemplary diagram including a horizontal time axis, illustrating sleep and listening windows of a PSC-D. In one exemplary embodiment, the PSC-D is formed from the connections on the device, and the ePSCs may be used to provide definitions for the PSC-D. As shown in the exemplary embodiment of FIG. 10, when there is an ePSC-T1 and an ePSC-T2, the connections may be combined into a single PSC-D (Type 1, 2). In Example 1 of FIG. 10, the data burst timer expires 1040 before the next scheduled sleep window is completed, and PSC-D (Type 1, 2) may enter sleep mode for the remainder of the sleep window. In Example 2 of FIG. 10, the data burst timer 1050 extends the default listening window into the next scheduled default listening window. PSC-D (Type 1, 2) does not go to sleep, but instead executes the next scheduled default listening window.

To create a PSC-D (Type 1, 2) based on Type 1 connections and Type 2 connections, the criteria to define an ePSC-T2 is used to determine the sleep and listening window lengths of the PSC-D (Type 1, 2). The protocols, timers, and signals from the ePSC-T1 are used on the PSC-D (Type 1, 2), to include the traffic timer and data burst timer. The HARQ traffic timer may be used to extend the listening windows of PSC-D when HARQ operations are not completed in time.

The protocols, timers, and signals from the ePSC-T1 may be modified for the PSC-D (Type 1, 2) in several ways. The traffic timer may start during the default listening window, and is not limited to starting at the beginning of the default listening window. While the traffic timer may be running, any Type 2 communication operations may be executed. If the traffic timer expires, MS 130 may complete any Type 2 communication operations and then go to sleep. The default listening window may be extended if a data burst is running or a HARQ traffic timer is running and/or expires without receiving an ACK. Any data burst and Type 2 communication operations may be carried out simultaneously.

As shown in both Examples 1 and 2 of FIG. 10, in the first and second listening windows of PSC-D (Type 1, 2), traffic timer 1010 expires normally. Traffic timer 1010 expires normally when no traffic indication signal or data burst is received when the timer is running. Because traffic timer 1010 expires normally in the first and second default listening windows of PSC-D (Type 1, 2), first and second default listening windows perform as ePSC-T2 default listening windows 1020. That is, first and second default listening windows perform as ePSC-T2 default listening windows 1020 because there is no data burst traffic. Additionally, in the third listening window of PSC-D (Type 1, 2), the traffic timer expires with the reception of a traffic indication signal or data burst 1030. The data burst timer is initiated after the reception of data burst 1030 after, or without, a positive traffic indication. In the exemplary Example 1 of FIG. 10, data burst timer expires 1040 before the duration of the next scheduled sleep window is ended, and PSC-D (Type 1, 2) may enter sleep mode for the remainder of the sleep window.

Additionally, the PSC-D (Type 1, 2) may allow any data burst operations that extend into the next scheduled sleep window to reduce the sleep window by that duration. This is similar to how a HARQ traffic timer that expires without an ACK may reduce the length of the next sleep window, without changing the end time of the next sleep window. If the data burst or HARQ operations extend through the duration of the next sleep window, the following sleep window will be the earliest time PSC-D (Type 1, 2) goes into an unavailability interval. In other words, if all activity ends, and a new default listening window is scheduled, PSC-D (Type 1, 2) will next execute that default listening window, and the sleep window will not be executed. The extension of the previous listening window completely used up, that is, overlapped, the scheduled time for the sleep window. In Example 2 of FIG. 10, the data burst timer 1050 extends into the next scheduled default listening window, so that PSC-D (Type 1, 2) does not go to sleep, but instead executes the next scheduled default listening window.

If there are no Type 1 data bursts, the PSC-D (Type 1, 2) will operate like an ePSC-T2. The PSC-D (Type 1, 2) may reduce the complexity of PSC management because there will be a single PSC regardless of the number of connections involved. The signaling load may be reduced, since the PSC-D (Type 1, 2) works like an ePSC-T2 until it receives a data burst and/or a positive traffic indication. The timers may reduce the need for signals, and the traffic indication may be received at a predetermined slot in the superframe during the default listening windows.

Additionally, the PSC-D (Type 1, 2) reduces power consumption because the flexible listening window size may lose less sleep window than a conventional system with listening windows overlapping sleep windows. The PSC-D (Type 1, 2) may also provide more consistent power savings over conventional alignment methods. The sleep window is of a fixed duration, except when the default listening window is adaptively extended and reduces the length of the sleep window. There is no unevenness in sleep window length from overlap of sleep and listening windows.

Figure 11:
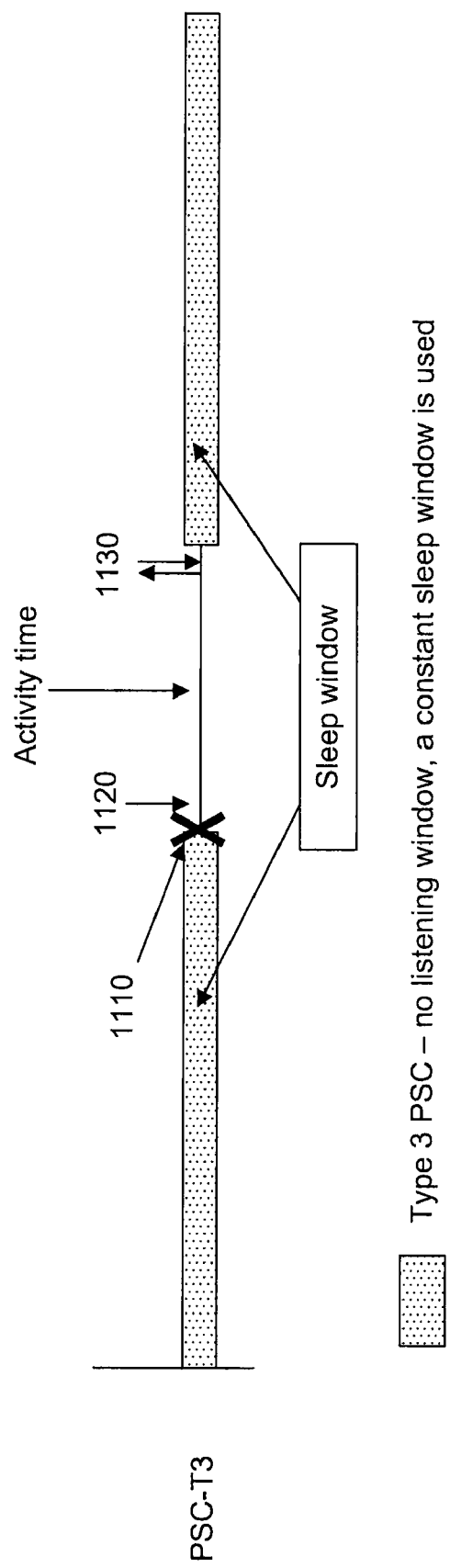
FIG. 11 is an exemplary diagram including a horizontal time axis, illustrating availability and unavailability intervals of a mobile device based on sleep and listening windows of an operational Type 3 PSC, consistent with certain disclosed embodiments.

FIG. 11 is a diagram including a horizontal time axis, illustrating availability and unavailability intervals of a mobile device, e.g., MS 130, based on sleep and listening windows of an operational Type 3 PSC. As discussed above, a Type 3 PSC has a single sleep window whose duration is based on an expected time period before activity. The duration and separation of the expected time period of activity and the sleep window, i.e., the expected time period before activity, is set based on an expected arrival of a next portion of data or next expected ranging request. More particularly, FIG. 11 shows how the operational Type 3 PSC at the end of sleep window is deactivated 1110. The activity time may stay active until signaling 1130 between MS 130 and BS 110 is used to reactivate the PSC and put the device back in sleep mode. An alternate way to activate the PSC is to use ranging requests to activate the PSC. During the activity time, MS 130 may receive data 1120. There is no method to automatically drop back into sleep mode, so signaling 1130 between MS 130 and BS 110 to reactivate the PSC-T3 may be required to determine when to return to sleep mode and how long the next sleep window may be.

Figure 12:
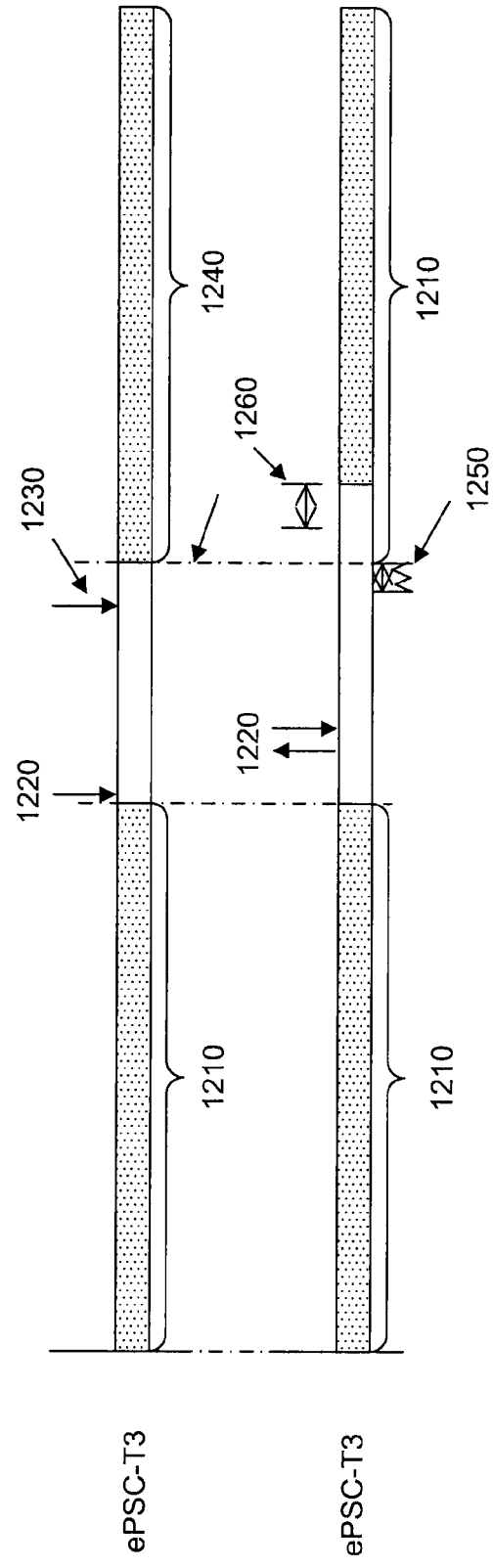
FIG. 12 is an exemplary diagram including a horizontal time axis, illustrating availability and unavailability intervals of a mobile device based on sleep and listening windows of an ePSC-T3 with timers, consistent with certain disclosed embodiments.

FIG. 12 is an exemplary diagram including a horizontal time axis, illustrating availability and unavailability intervals of a mobile device, e.g., MS 130, based on sleep and listening windows of an ePSC-T3 with timers. As discussed above, a Type 3 PSC has a single sleep window whose duration is based on an expected time period before activity. The duration and separation of the expected time period of activity and the sleep window, i.e., the expected time period before activity, is set based on an expected arrival of a next portion of data or next expected ranging request. More particularly, Examples 1 and 2 of FIG. 12 show how the EPSC-T3 has a predicted inactivity time 1210 corresponding to a sleep window. At the end of the sleep window, a listening window is initiated with a duration which may be equal to a multiple of the longest timer used to monitor incoming traffic, or the duration may be based on other methods. The ePSC-T3 may be a combination of one or more Type 3 connections. The Type 3 connections are combined to define a fixed sleep window and a default listening window. The ePSC-T3 is a specialized ePSC-T2.

The ePSC-T3 may include a data burst timer and a HARQ traffic timer. The data burst timer may run for a duration equal to the amount of time in which new data is expected. The data burst timer is restarted at every reception of new data, until it expires without any receptions of data. The data burst timer is not designed to be long enough to allow all transmissions to be completed without the data burst timer being reset. The data burst timer is the duration to be spent waiting for a data burst reception before the device begins a sleep window. The data burst timer's role is to monitor incoming data burst traffic. Alternatively, BS 110 may still use signaling to define the end of a data burst and/or use signaling to define new parameters to MS 130. When the data burst timer expires, if no signals have been received by MS 130 to indicate otherwise, the next sleep window will be started.

The HARQ traffic timer starts with a retransmission, if a retransmission occurred, and runs for the return time for an ACK/NAK from BS 110 as a result of the retransmission. The HARQ traffic timer is used to extend the default listening window when an ACK is not received after a transmission. If an ACK is received, the HARQ traffic timer may expire normally, and the default listening window terminates. If the HARQ traffic timer expires without receiving an ACK, or a NAK is received, the listening window will be extended to allow a retransmission of the data. When all the timers have expired normally, the ePSC-T3 may use the same duration sleep and listening windows, unless BS 110 specifies the next sleep window duration and/or when to schedule the next listening window either through signals or implicitly in the MAP of the last data sent. An independent signal specifying or the MAP specifying the next sleep window duration and/or when to schedule the next listening window, in effect, resets the duration of either or both the fixed duration sleep window or the default listening window of the ePSC-T3.

As shown in both Examples 1 and 2 of FIG. 12, the predicted inactivity time 1210 is the first sleep window of ePSC-T3. During the listening window, data may be received and/or sent (1220). In Example 1 of FIG. 12, all the timers expire normally before the end of the listening window. Signal 1230 is received before the end of the scheduled default listening window. Alternatively, signal 1230 may be included in the MAP of the data burst. Signal 1230 triggers ePSC-T3 to begin the next sleep window and when to schedule the next wake-up, that is, the start of the next default listening window. ePSC-T3 may initiate a new sleep window equal to the length of the new predicted inactivity time 1240. In Example 2 of FIG. 12, a timer does not expire normally (1250). The timer may be the data burst timer or the HARQ traffic timer. The listening window may be extended, as discussed above, to allow the completion of the transmission or a retransmission. Once all timers have expired normally (1260), and no signals are received, ePSC-T3 may enter sleep mode for the remainder of the sleep window.

The use of flexible default listening windows and the HARQ traffic timer in the ePSC-T3 may increase the duration of the sleep windows, increasing power savings. Additionally, by using the HARQ traffic timer, the ePSC-T3 can adaptively respond to communication issues and increase the duration of the listening window. The ePSC-T3 improves the power savings mode while eliminating long deactivation periods. The ePSC-T3 eliminates the need for deactivation and reactivation of the operational PSC-T3 and the required signaling exchange for those deactivations and reactivations. Additionally, because the previous sleep window and listening window durations may be reused, BS 110 may not always have to use signals to define the next sleep window and the next listening window durations.

The ePSC-T2 may have more frequent default listening windows than an ePSC-T3. The ePSC-T1 may also have more frequent default listening windows at the start of the PSCs than an ePSC-T3, but if no traffic is received, the frequency of the ePSC-T1 listening windows will decrease. The power savings of an ePSC-T3 may be reduced when combining an ePSC-T3 with an ePSC-T2 and/or at some point also with an ePSC-T1. As with any combination of PSCs, when the sleep and listening intervals overlap, there may be a reduction in device power savings.

Figure 13:
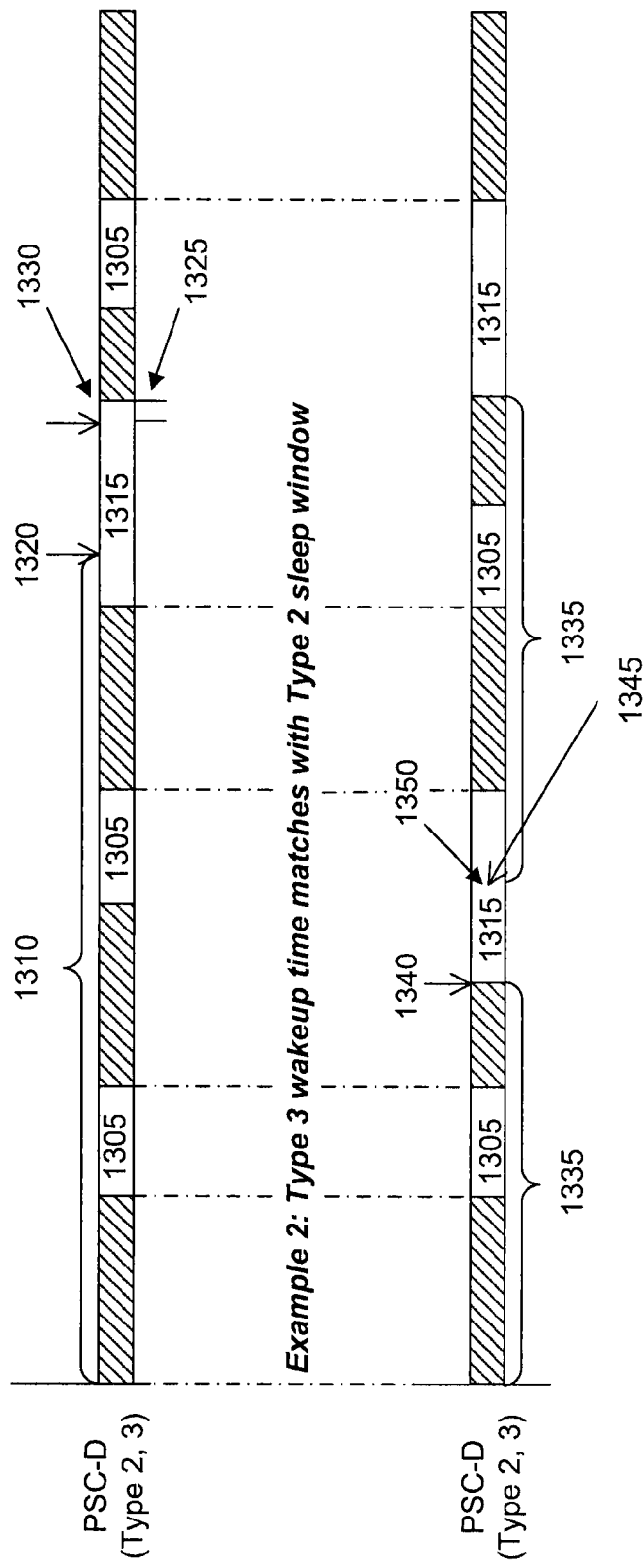
FIG. 13 is an exemplary diagram including a horizontal time axis, illustrating available and unavailable intervals of a mobile device based on sleep and listening windows of multiple Type 2 and Type 3 connections combined into a PSC-D, consistent with certain disclosed embodiments.

FIG. 13 is an exemplary diagram including a horizontal time axis, illustrating availability and unavailability intervals of a mobile device, e.g., MS 130, based on sleep and listening windows of multiple Type 2 and Type 3 connections combined into a PSC-D. As shown in both Examples 1 and 2 of FIG. 13, when there is an ePSC-T2 and an ePSC-T3, the connections may be combined into a single PSC-D (Type 2, 3). In one exemplary embodiment, the PSC-D is formed from the connections on the device, and the ePSC may be used to provide definitions for the PSC-D. In Example 1, the wakeup time defined for an ePSC-T3 falls in the default listening window defined for an ePSC-T2. If the Type 3 connection activities extend into the next scheduled sleep window, the start of the sleep window may be delayed, but the end of the sleep window will not change. In Example 2, the wakeup time defined for an ePSC-T3 falls in the sleep window defined for an ePSC-T2. In Example 2, PSC-D (Type 2, 3) will cut short the sleep window to start a new default listening window.

To create a PSC-D (Type 2, 3) composed of Type 2 connections and Type 3 connections, the criteria to define an ePSC-T2 is used to determine the sleep and default listening window lengths of the PSC-D (Type 2, 3). The protocols, timers, and signals from the ePSC-T3 are used on the PSC-D (Type 2, 3), to include the predicted sleep time, the data burst timer, and the HARQ traffic timer. Unless there is Type 3 connection traffic, the PSC-D (Type 2, 3) will perform as an ePSC-T2 when the PSC-D definitions are based on ePSC-T2. In some scenarios, there will be several default listening windows where only Type 2 connection traffic activity is expected, during the Type 3 connection predicted inactivity time, before a default listening window occurs where Type 2 connection and Type 3 connection activity may be expected. Alternatively, it is possible to have scenarios in which the Type 3 inactivity time is shorter than the sleep window of a Type 2 connection, in which case the PSC-D definitions may be based on ePSC-T3. If the predicted inactivity time is equal to the sleep window, or equal to a multiple integer of the sleep window and default listening window, and the listening windows of the Type 2 connection and Type 3 connection are the same duration, the PSC-D (Type 2, 3) may look like the ePSC-T2. Any Type 2 and Type 3 activity may be carried out simultaneously.

In Example 1 of FIG. 13, the first three sleep windows and a first two default listening windows 1305 are based on the definitions for an ePSC-T2. The HARQ traffic timers were not initiated, and the sleep windows begin on time. The end of the predicted inactivity time for ePSC-T3 (1310) aligns with a third default listening window 1315. Type 3 activity may begin in third default listening window 1315, with the start of a data burst timer 1320. In third default listening window 1315, all Type 3 timers 1325 end without any data burst reception. The PSC-D (Type 2, 3) may not enter its next sleep window until all timers have expired, even if it extends the default listening window into a sleep window. PSC-D (Type 2, 3) will enter a sleep mode 1330 for the remainder of the sleep window.

In Example 2 of FIG. 13, the first sleep window and first default listening window 1305 are based on the definitions for an ePSC-T2. The HARQ traffic timer did not start, and the sleep window begins on time. The end of predicted inactivity time for ePSC-T3 1335 aligns with a second sleep window 1340. The end of a predicted inactivity time for ePSC-T3 (1335) falls within a sleep window, ending the sleep window. Type 3 activity may begin at that time. Because PSC-D (Type 2, 3) is already in a default listening window, the scheduled start of a next default listening window 1345 has no effect on PSC-D (Type 2, 3). At the scheduled start of the next default listening window 1345, any scheduled Type 2 activity 1350 may begin. Once any timers have expired normally, the third sleep window may begin. Likewise, the fourth sleep window may be cut short by the end of the second predicted inactivity time for ePSC-T3 (1335).

As shown in Examples 1 and 2 of FIG. 13, the procedure for an ePSC-T3 is applied to the PSC-D (Type 2, 3). In some exemplary embodiments, the listening windows for Type 3 connections will overlap with the default listening windows based on the ePSC-T2 in the PSC-D (Type 2, 3). In one exemplary embodiment, some default listening windows of the PSC-D (Type 2, 3) will only be for Type 2 activity 1305, while other default listening windows will include both Type 2 and Type 3 activity 1315. In another exemplary embodiment, if the Type 3 connections require more frequent listening windows than the Type 2 connections, some default listening windows of the PSC-D (Type 2, 3) will only be for Type 3 activity, while other default listening windows will include both Type 2 and Type 3 activity. During a default listening window, if the timers end with no activity, the PSC-D (Type 2, 3) will return to sleep. The timers may extend the default listening window into the sleep window of the PSC-D (Type 2, 3). If a signal for a future wakeup is received, a listening window will be scheduled for that time, even if it would normally be part of a Type 2 connection's sleep window, as shown in Example 2 of FIG. 13. The predicted Type 3 inactivity time 1335 may be such that overlap with a fixed sleep window is inevitable, and that portion of the sleep window will be cancelled, and treated as part of the adjoining default listening window. As in an ePSC-T3, the default listening window can be extended to include the next sleep window.

The default listening window may be extended if the data burst timer is running because Type 3 activity is received or a HARQ traffic timer is running and/or expires without receiving an ACK. The default listening window may be extended into the next sleep window. When all Type 2 and Type 3 activity is completed, the rest of the sleep window will be used. The sleep window is not shifted, instead its duration is reduced.

If there are no Type 3 activities or Type 2 activities, the PSC-D (Type 2, 3) will operate like an ePSC-T2 or an ePSC-T3, according to the ePSC used as definitions of the PSC-D. The PSC-D (Type 2, 3) may reduce the complexity of PSC management because there will be a single PSC regardless of the number of connections. The signaling load may be reduced, since the PSC-D (Type 2, 3) may work like an ePSC-T2 until Type 3 activity occurs. The timers may reduce the need for signals to negotiate sleep times, and the signals may be received at the default listening windows.

Figure 14:
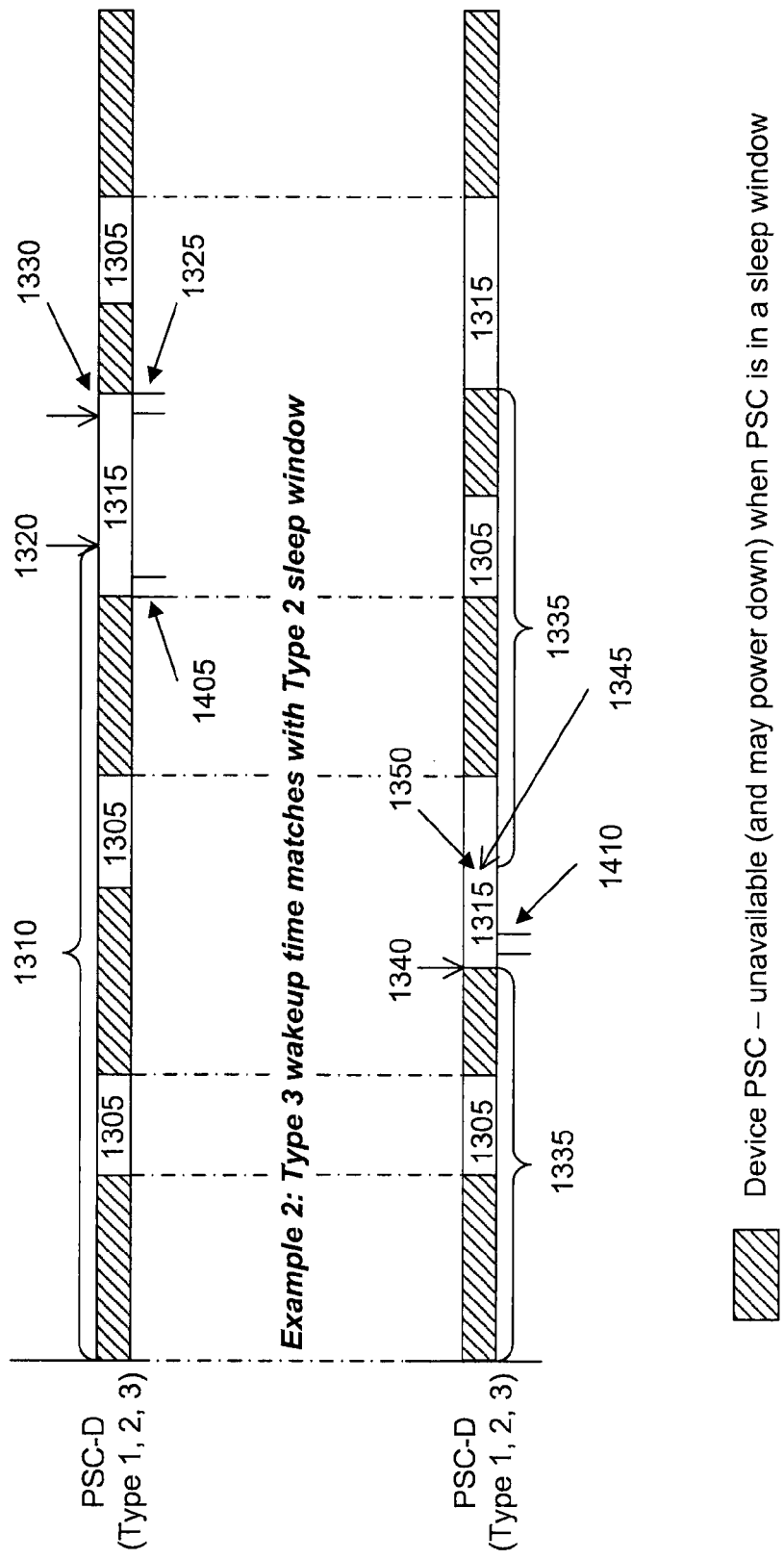
FIG. 14 is an exemplary diagram including a horizontal time axis, illustrating available and unavailable intervals of a mobile device based on sleep and listening windows of multiple Type 2, Type 3, and Type 1 connections combined into a PSC-D, consistent with certain disclosed embodiments.

FIG. 14 is an exemplary diagram including a horizontal time axis, illustrating availability and unavailability intervals of a mobile device, e.g., MS 130, based on sleep and listening windows of multiple Type 2, Type 3, and Type 1 connections combined into a PSC-D. Both exemplary embodiments of FIG. 14 show the merging of Type 1 connections with the PSC-D (Type 2, 3) to form a PSC-D (Type 1, 2, 3). The merger is based on the definitions of an ePSC-T1 that would be formed from the Type 1 connections. FIG. 14 is a modified version of FIG. 13, and the discussion above as relates to FIG. 13 applies to FIG. 14. The listening windows of the Type 1 connections are scheduled to overlap with the listening windows of the PSC-D (Type 2, 3). In Example 1 of FIG. 14, a traffic timer 1405 may start during any scheduled default listening window of the PSC-D (Type 1, 2, 3). In Example 2 of FIG. 14, a traffic timer 1410 may start during any scheduled default listening window of the PSC-D (Type 1, 2, 3). The merging of Type 1 connections with a PSC-D (Type 2, 3) may apply all the modifications to the enhanced Type 1 protocol as the merging of Type 1 and Type 2 connections to form a PSC-D (Type 1, 2) previously discussed with FIG. 10. The traffic timer, data burst timer, and HARQ traffic timer may be used during the default listening window of the PSC-D (Type 1, 2, 3). If a timer adaptively extends the default listening window into a sleep window, the sleep window may start when that timer ends. If the sleep window is eliminated by timers, the next sleep window will start at its regularly scheduled time, unless it also is delayed by timers. A PSC-D (Type 1, 2, 3) may have many of the features and advantages of both a PSC-D (Type 1, 2) and/or a PSC-D (Type 2, 3), as previously discussed.

Figure 15:
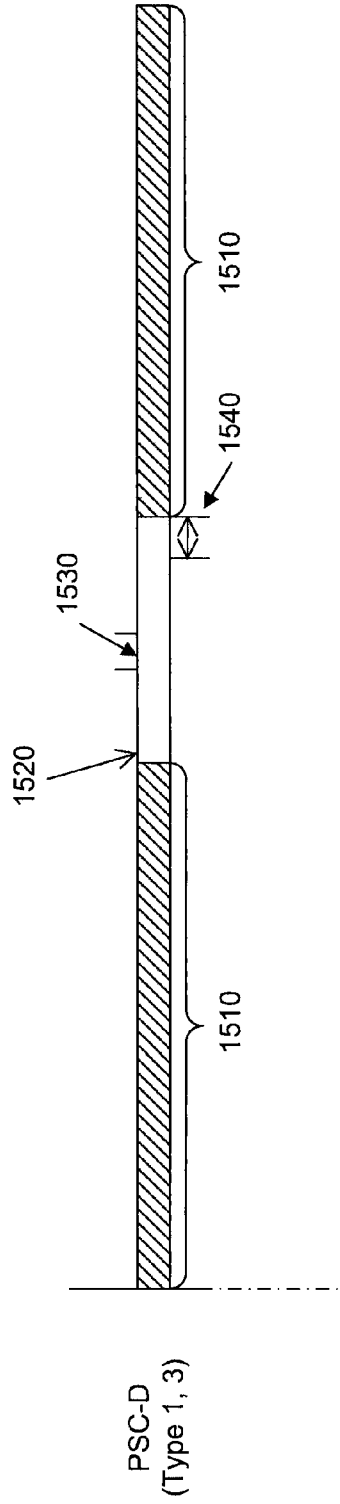
FIG. 15 is an exemplary diagram including a horizontal time axis, illustrating available and unavailable intervals of a mobile device based on sleep and listening windows of multiple Type 1 and Type 3 connections combined into a PSC-D, consistent with certain disclosed embodiments.
Figure 15:
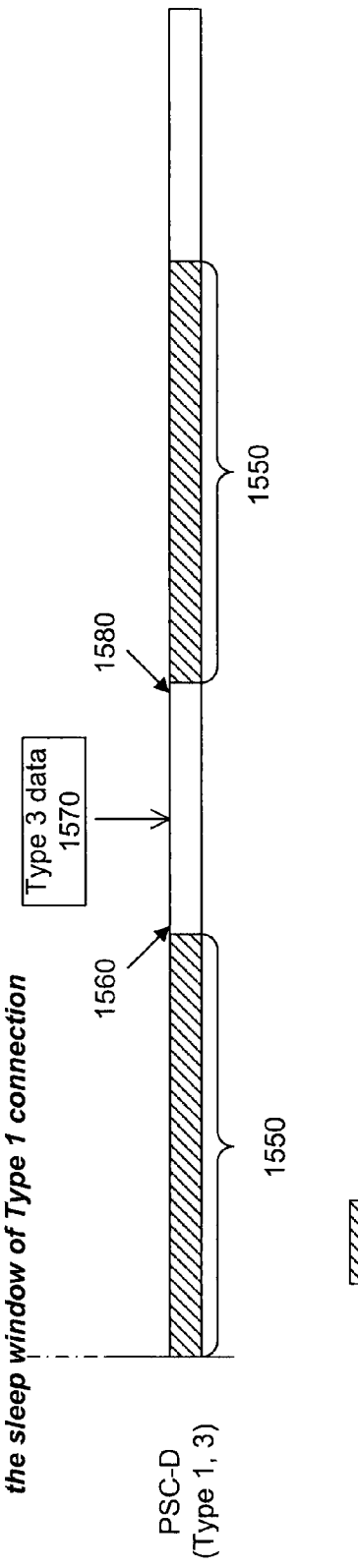

FIG. 15 is an exemplary diagram including a horizontal time axis, illustrating availability and unavailability intervals of a mobile device, e.g., MS 130, based on sleep and listening windows of multiple Type 1 and Type 3 connections combined into a PSC-D. As shown in both Examples 1 and 2 of FIG. 15, when there are Type 1 connections and Type 3 connections, the two types of connections may be combined into a single PSC-D (Type 1, 3). In one exemplary embodiment, the PSC-D is formed from the connections on the device, and the ePSC may be used to provide definitions for the PSC-D. In Example 1 of FIG. 15, the ePSC-T3's sleep window, that is, the predicted inactivity period for the Type 3 connections, is shorter than the fixed maximum duration of the sleep window of the ePSC-T1. The fixed maximum duration of the sleep window of ePSC-T1 is based on the maximum buffer capacity of BS 110 for Type 1 connection traffic. In this case, the sleep window of the PSC-D (Type 1, 3) is set to the ePSC-T3 sleep window length. Example 2 of FIG. 15 shows the ePSC-T3's sleep window, that is, the predicted inactivity period for the Type 3 connections, being longer than the fixed maximum duration of the sleep window of the ePSC-T1. In this case, the sleep window of the PSC-D (Type 1, 3) is set to the ePSC-T1 fixed maximum duration sleep window length, that is, the maximum buffer capacity of BS 110 for Type 1 connection traffic. PSC-D (Type 1, 3) may look like alternating sleep windows and listening windows. In one example, where BS 110 may need to empty the buffer of Type 1 connection activity more often than the predicted inactivity period for the Type 3 connections, the default sleep window may be chosen shorter than the maximum capacity of the buffer of Type 1 connection activity.

In Example 1 of FIG. 15, the duration of the first sleep window is set equal to a predicted inactivity period 1510 for the ePSC-T3. A type 3 activity 1520 may begin at the start of the first default listening window. The start of the first default listening window aligns with the end of the predicted inactivity period 1510 for the Type 3 connections. During the first default listening window, Type 1 traffic activity may begin with the start of a traffic timer 1530. The PSC-D (Type 1, 3) may not enter its next sleep mode until all timers 1540 have expired or it received a signal for doing so, even if it extends the default listening window into the next sleep window. PSC-D (Type 1, 3) will enter sleep mode for the remainder of the sleep window.

In Example 2 of FIG. 15, the duration of the first sleep window is set equal to the fixed maximum duration of a sleep window 1550 for the Type 1 connections. The fixed maximum duration of a sleep window may be equal to the maximum buffer capacity of BS 110 for Type 1 connection traffic. Type 1 communication activity 1560 may begin at the start of the first default listening window. The start of the first default listening window aligns with the end of the sleep window 1550 based off ePSC-T1. During the first default listening window, Type 3 traffic activity 1570 may begin. The PSC-D (Type 1, 3) may not enter its next sleep mode until all timers have expired and/or a signal to enter a sleep window and the duration of that sleep window 1580 has been received.

The PSC-D (Type 1, 3) uses timers based off of the ePSC-T1 and the ePSC-T3. The traffic timer of the ePSC-T1 may start anytime during the default listening window, not just at the start of the default listening window of the PSC-D (Type 1, 3). The traffic timer may be started based on the predetermined location of the traffic indication in the superframe. Ideally, the traffic timer starts near the beginning of the default listening window. The next sleep window may commence when either all timers have expired normally (1540) or the timer has been cancelled by a signal to return to sleep (1580). When all Type 1 and Type 3 activity is completed, the rest of the next scheduled sleep window will be executed. The sleep window is not shifted, instead its duration is reduced. If a signal for a future wakeup is received for a Type 3 activity, a default listening window will be scheduled for that time, even if it would normally be part of a sleep window. Like in an ePSC-T3, the default listening window can be extended to include one or more sleep windows. A PSC-D (Type 1, 3) may have many of the features and advantages of both a PSC-D (Type 1, 2) and a PSC-D (Type 2, 3), as previously discussed.

Figure 16:
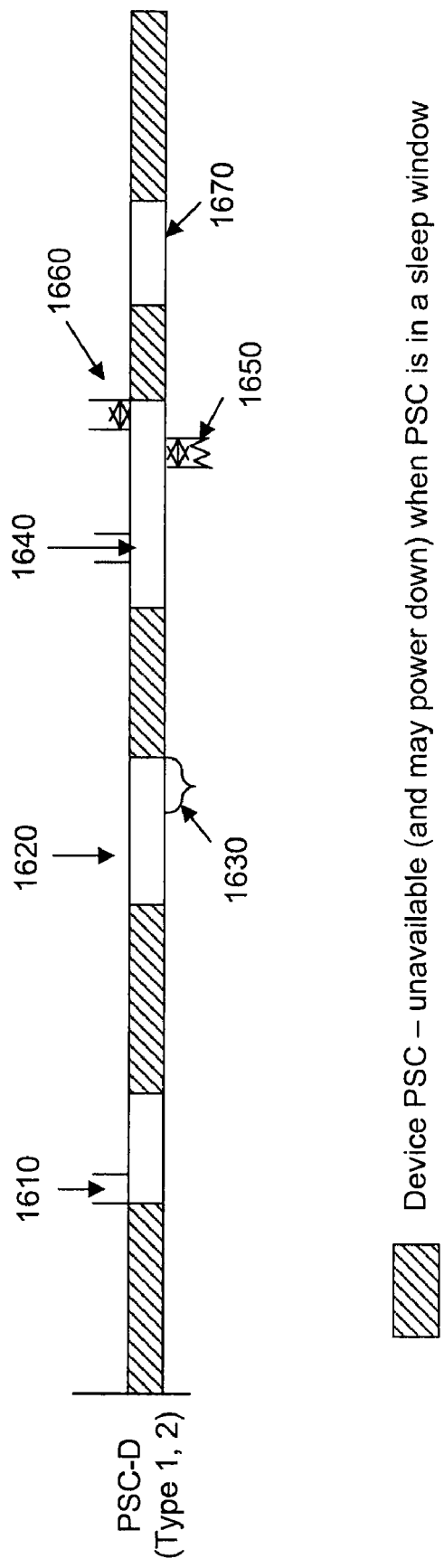
FIG. 16 is an exemplary diagram including a horizontal time axis, illustrating available and unavailable intervals of a mobile device based on sleep and listening windows of multiple Type 1 and Type 2 connections combined into a PSC-D, consistent with certain disclosed embodiments.

FIG. 16 is an exemplary diagram including a horizontal time axis, illustrating availability and unavailability intervals of a mobile device, e.g., MS 130, based on sleep and listening windows of multiple Type 1 connections and Type 2 connections combined into a PSC-D. As shown in the exemplary embodiment in FIG. 16, when there are Type 1 connections and Type 2 connections, the two types of connections may be combined into a single PSC-D (Type 1, 2). FIG. 16 shows an example of such a PSC-D (Type 1, 2) where the Type 1 traffic activity is not available in every listening window.

As shown in FIG. 16, the PSC-D (Type 1, 2) may have a default listening window and sleep window based on the ePSC-T2 default listening and sleep windows. Every n (n>=1) default listening windows, there may be Type 1 activity allowed. In the example of FIG. 16, n=2. The time before the buffer capacity for Type 1 traffic of BS 110 overflows should be greater than the duration of the number n of default listening window, before receiving Type 1 traffic. In a first default listening window 1610, there is an opportunity for Type 1 activity, but no data burst or positive traffic indication is received before the traffic timer expires. First default listening window 1610 behaves as an ePSC-T2 listening window. Additionally, the HARQ traffic timer expires, and the default listening window is not extended into the next sleep window. In a second default listening window 1620, there is no opportunity for Type 1 activity. Second default listening window 1620 will operate like an ePSC-T2 default listening window. Additionally, in second default listening window 1620, a HARQ traffic timer 1630 expires without receiving an ACK, the HARQ traffic timer is reset, and the default listening window is extended into the next sleep window.

As shown in FIG. 16, in the third default listening window, there is an opportunity for Type 1 activity 1640. A data burst starts after, or without, the reception of a positive traffic indication signal. A data burst timer is initiated. Before the data burst timer expires, a new data burst is received, and the data burst timer is reset (1650). The third default listening window is extended into the next sleep window. The HARQ traffic timer is not initiated because no retransmission occurs, and the third default listening window is not further extended into next sleep window 1660. In a fourth default listening window 1670, there is no opportunity for Type 1 activity. Fourth default listening window 1670 will operate like an enhanced Type 2 default listening window. Additionally, the HARQ traffic timer is not initiated because no retransmission occurs, and the default listening window is not extended into the next sleep window. Not having an opportunity for Type 1 activity at every default listening window may reduce the use of timers/signals when there is a low probability of transmission and may increases the consistency of sleep windows.

Figure 17:
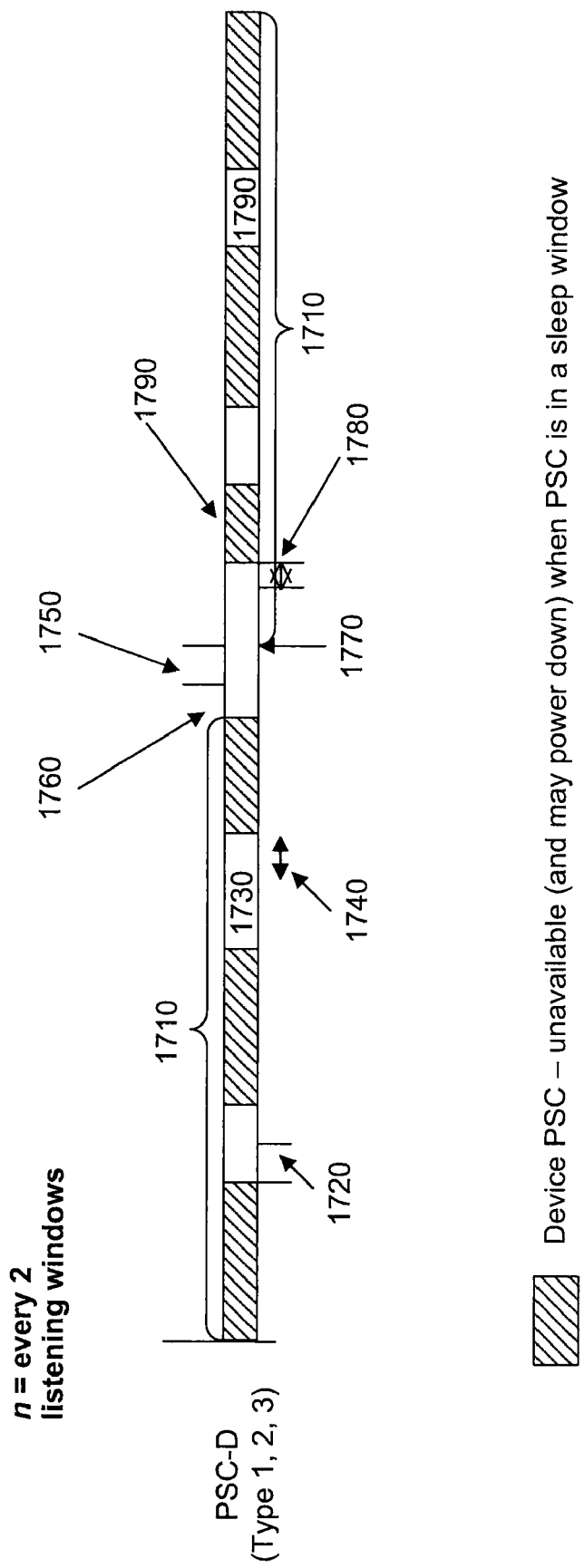
FIG. 17 is an exemplary diagram including a horizontal time axis, illustrating available and unavailable intervals of a mobile device based on sleep and listening windows of multiple Type 1, Type 2, and Type 3 connections combined into a PSC-D, consistent with certain disclosed embodiments.

FIG. 17 is an exemplary diagram including a horizontal time axis, illustrating availability and unavailability intervals of a mobile device, e.g., MS 130, based on sleep and listening windows of multiple Type 1, Type 2, and Type 3 connections combined into a PSC-D. As shown in the exemplary embodiment of FIG. 17, when there are Type 1 connections, Type 2 connections, and Type 3 connections, these connections may be combined into a single PSC-D (Type 1, 2, 3). FIG. 17 shows an example of such a PSC-D (Type 1, 2, 3) where the Type 1 and Type 3 traffic activity may not be available every default listening window.

The PSC-D (Type 1, 2, 3) may have a default listening window and sleep window based on the ePSC-T2 default listening and sleep window. Every n (n>=1) default listening windows, there may be Type 1 activity allowed. The traffic indication message occurrence counter (n) defines the number of sleep cycles (sleep and listening windows), as can be measured by the number of default listening windows, before a traffic indication is sent. In the example of FIG. 17, the traffic indication message occurrence counter equals two (n=2). The predicted Type 3 inactivity time may be longer than one default listening window and one default sleep window. The predicted Type 3 inactivity time may also be shorter than or equal to a default sleep window of the Type 2 connections. In the example of FIG. 17, a predicted inactivity time 1710 is two default listening windows and three sleep windows. In the first default listening window, there is an opportunity for Type 1 activity 1720, but no data burst or positive traffic indication is received before the traffic timer expires. The first default listening window is also during the predicted Type 3 inactive time, and no Type 3 activity is expected. Additionally, the HARQ traffic timer did not start, and the default listening window is not extended into the next sleep window. In a second default listening window 1730, there is no opportunity for Type 1 activity or Type 3 activity. Second default listening window 1730 will operate like an ePSC-T2 default listening window. Additionally, in second default listening window 1730, a HARQ traffic timer 1740 expires without receiving an ACK, and second default listening window 1730 is extended into the next sleep window.

In the third default listening window, there is an opportunity for Type 1 activity 1750. A data burst starts before the traffic timer expires and after, or without, the reception of a positive traffic indication. A data burst timer is initiated. Before the data burst timer expires, a new data burst is received, and the timer is reset. The third listening window is extended into the next sleep window. Additionally, there is an opportunity for Type 3 activity 1760. Once the Type 3 activity is complete, but before the data burst timer expires, a signal from BS 110 is received signaling a return to sleep and/or the next wake up time for Type 3 activity 1770. Because Type 1 and/or Type 2 activity is ongoing, and/or the default listening window is not ended, the next sleep window does not start with the reception of a signal to sleep from BS 110. Then, the signal to sleep and next wake up time for Type 3 activity 1770 may act, in effect, to signal when the next wake up time for Type 3 traffics is. This signal could also be integrated into the MAP of the last data burst received. The HARQ traffic timer and a data burst timer 1780 expire normally, and the default listening window is not further extended into the next sleep window. In a fourth default listening window 1790, there is no opportunity for Type 1 activity or Type 3 activity. Fourth default listening window 1790 will operate like an ePSC-T2 default listening window. Additionally, there is no HARQ traffic timer initiated, and the default listening window is not extended into the next sleep window. Not having an opportunity for Type 1 activity or Type 3 activity every default listening window may reduce the use of timers and/or signals when there is a low probability of transmission and may increases the consistency of sleep windows.

Figure 18:
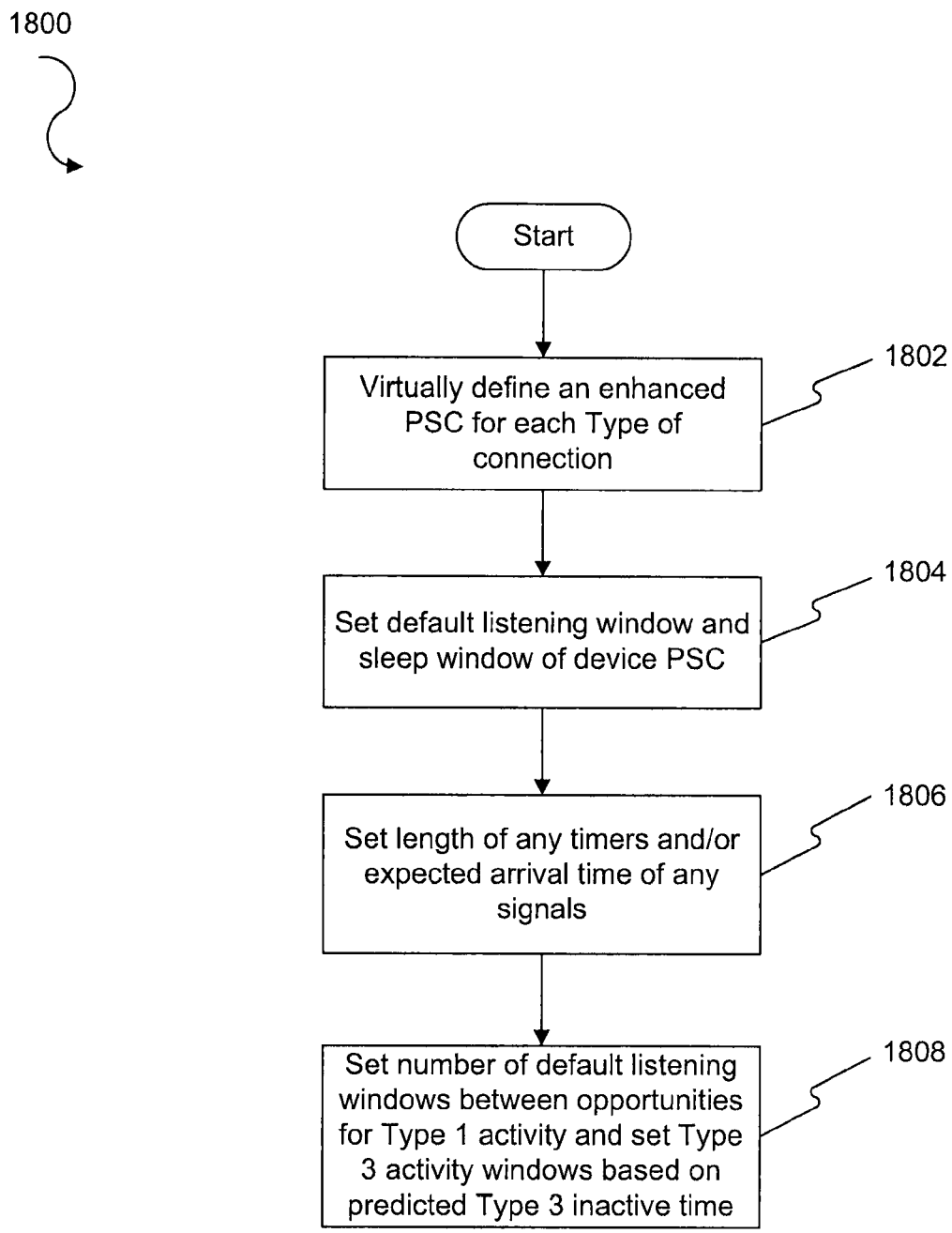
FIG. 18 is a flow chart illustrating an exemplary method to assemble a PSC-D, consistent with certain disclosed embodiments.

FIG. 18 shows a flow chart 1800 illustrating an exemplary embodiment of a method to assemble a PSC-D. Assembly of a PSC-D is used to combine one or more Type 1 connections, Type 2 connections, and Type 3 connections into one PSC-D. An enhanced PSC is virtually defined for each type of PSC expected or designated for MS 130 (1802). The PSC-D is formed from the connections, and not any ePSCs, when more than one type of connection is present. The ePSCs are virtually defined to aid in the construction of the PSC-D. If there are one or more Type 1 connections present, an ePSC-T1 will be virtually defined. If there are one or more Type 2 connections present, an ePSC-T2 will be virtually defined. If there are one or more Type 3 connections present, an ePSC-T3 will be virtually defined. The criteria to define the enhanced PSC have been previously discussed.

The default listening window and sleep window of the PSC-D are set (1804). When all the connections are present, the default listening window and sleep window of the PSC-D are set based on the most constraining virtually defined ePSC. In one example, the default listening window and sleep window of the PSC-D are set based on the virtual definitions of the ePSC-T2 or the Type 2 connections. If there is no Type 2 connections, the default listening window and sleep window of the PSC-D are set based on the virtual definition of the ePSC-T3 or the Type 3 connections. Otherwise the PSC-D may be an ePSC-T1.

The length of the timers and/or expected arrival of signals are set (1806). The length of the timers and/or expected arrival of signals are used to determine when the default listening window should be extended into the next sleep window. If there is no Type 1 or Type 3 activity, the default listening window is treated like an ePSC-T2 default listening window.

The number of listening windows between opportunities for Type 1 activity are set (1808). Setting a number of listening windows between opportunities for Type 1 activity may reduce design complexity when no Type 1 activity is expected. In some embodiments, this may be optional. Setting a number of listening windows between opportunities for Type 1 activity may improve sleep window use efficiency. Additionally, the predicted Type 3 inactive time is used to determine which default listening windows may have Type 3 activity, and what additional listening window time may be needed to accommodate the expected Type 3 activity.

Once a PSC-D is implemented, an ability to dynamically update the PSC-D may be implemented. The virtual definitions used to define the PSC-D may see one or more connections drop out or added in. A connection may drop out when all its components have been dropped. If a connection is dropped or added, the virtual enhanced PSC of that Type may change to better conform to the traffic demands. Additionally, the PSC-D may change to better conform to the traffic demands. For example, when a connection drops, since BS 110 and MS 130 are aware of the dropped connection, in the next default listening window BS 110 and MS 130 may negotiate a new sleep and default listening window with signals. By allowing dynamic updating of the PSC-D through signaling during the next default listening window, the PSC-D can be adjusted without going through a deactivation and reactivation during a sleep mode.

The deletion or addition of a Type 1 connection which does not delete the virtual ePSC-T1 is unlikely to affect the sleep/listening window pattern of the PSC-D and/or the duration of the timers on the PSC-D. The deletion or addition of a Type 2 connection which does not delete the virtual ePSC-T2 may change the sleep and listening window pattern of the virtual ePSC-T2, and/or the duration of the timers of the virtual ePSC-T2. A change to the sleep and listening window pattern and/or the duration of the timers of the virtual ePSC-T2 may cause a change to the sleep and listening window pattern and/or the duration of the timers of the PSC-D. The new window length can be sent by signaling and implemented on the next sleep window. Because a virtual ePSC-T3 is implemented essentially as a special case of a virtual ePSC-T2, the deletion or addition of a Type 3 connection which does not delete the virtual ePSC-T3 may have the same effect as if a Type 2 connection was deleted or added from/to the virtual ePSC-T2.

Figure 19:
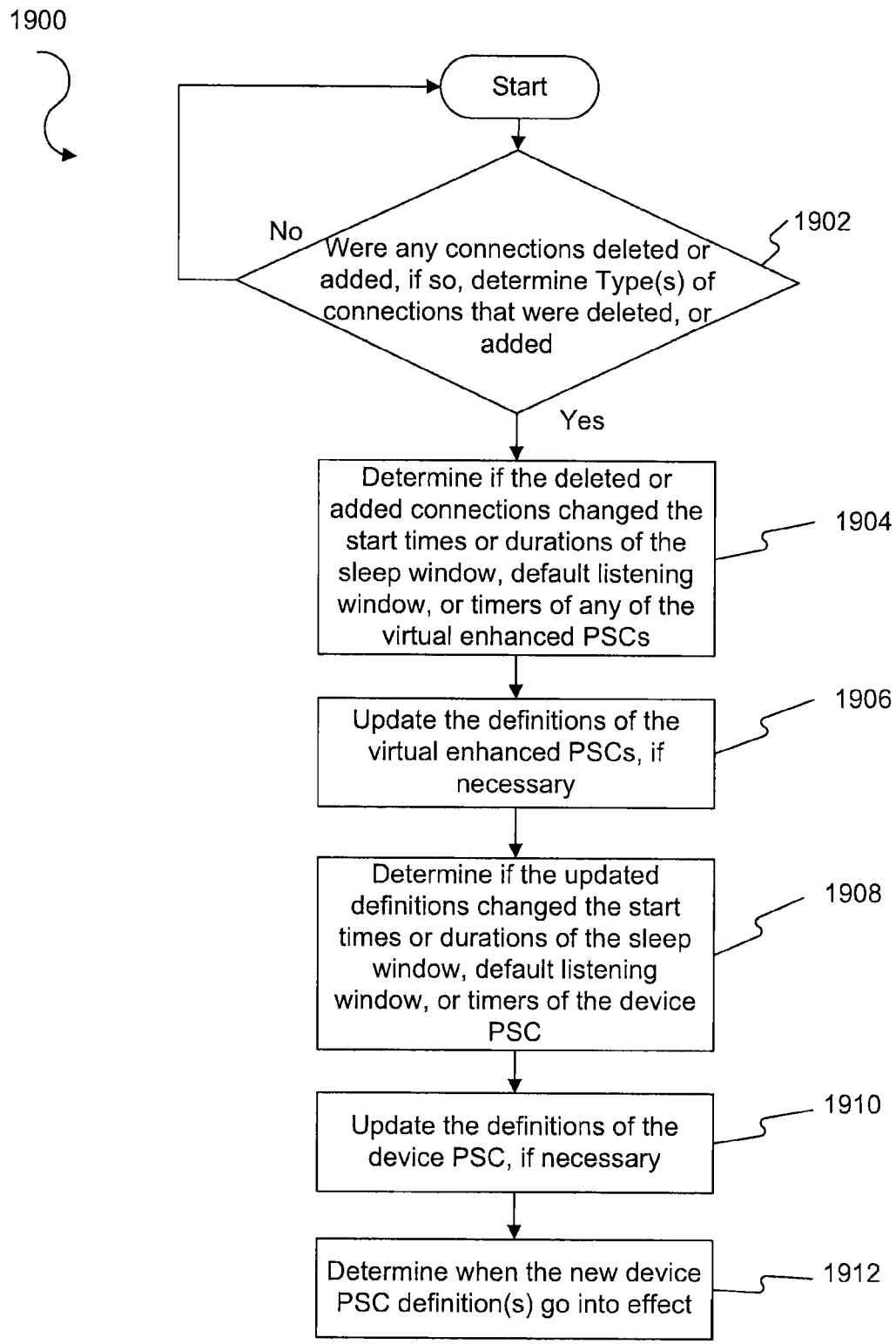
FIG. 19 is a flow chart illustrating an exemplary method to dynamically update a PSC-D when a connection is deleted or an entire connection type is deleted, consistent with certain disclosed embodiments.

FIG. 19 shows a flow chart 1900 illustrating an exemplary embodiment of a method to dynamically update a PSC-D when a connection is deleted or added or an entire connection type is deleted or added, that is, a virtual ePSC is deleted or added. Dynamic updating of a PSC-D is used to adjust the PSC-D without going through a deactivation and reactivation during a sleep mode.

First, it is detected whether any connections, or all the connections of a type, have been deleted or added (1902). If one or more of connections were deleted or added, the Type(s) of the connections that were deleted or added are determined. Additionally, if one or more connections were deleted or added, it will be determined if a Type of connection was deleted or added, that is, no more of that connection Type are present on the PSC-D or a new connection type is present on the PSC-D. If no connections were deleted or added, then detection 1902 will be executed again after some predetermined time, or at the start or end of the next listening window.

If at least one connection or virtual ePSC was deleted or added, it is next determined if the deleted or added connection or virtual ePSC changed the start times or durations of the sleep window, default listening window, or timer of any of the virtual ePSCs (1904). The start times and/or durations of the sleep window, default listening window, or timer are all part of the definition of the PSC-D. If one of the definitions of a virtual ePSC have been changed or the virtual ePSC is deleted or added, there may be a need to dynamically update the PSC-D, if the change to the virtual ePSC definitions or the complete deletion or addition of a virtual ePSC would change the definitions of the PSC-D.

Next, the definitions of the virtual ePSCs are updated, if necessary (1906). If the start time or duration of the sleep window, default listening window, or any of the timers has been changed, the virtual ePSCs will be updated. The virtual ePSCs are used, as previously described, to help define the PSC-D.

Next, it is determined whether the updated virtual ePSC(s) changed the start times or durations of the sleep window, default listening window, or timers of the PSC-D (1908). Next, the definitions of the PSC-D are updated, if necessary (1910). If the start time or duration of the sleep window, default listening window, or any of the timers has been changed, the PSC-Ds will be updated.

Next, it is determined when the new PSC-D definition(s) go into effect (1912). When a connection is deleted or added, since BS 110 and MS 130 are aware of the deleted or added connection, in the next default listening window BS 110 and MS 130 may negotiate a new sleep and listening window with signals. Alternatively, BS 110 or MS 130 may unilaterally impose new definitions, and through signals inform the other device. In a subsequent default listening window, the new sleep and default listening windows may be applied.

Figure 20:
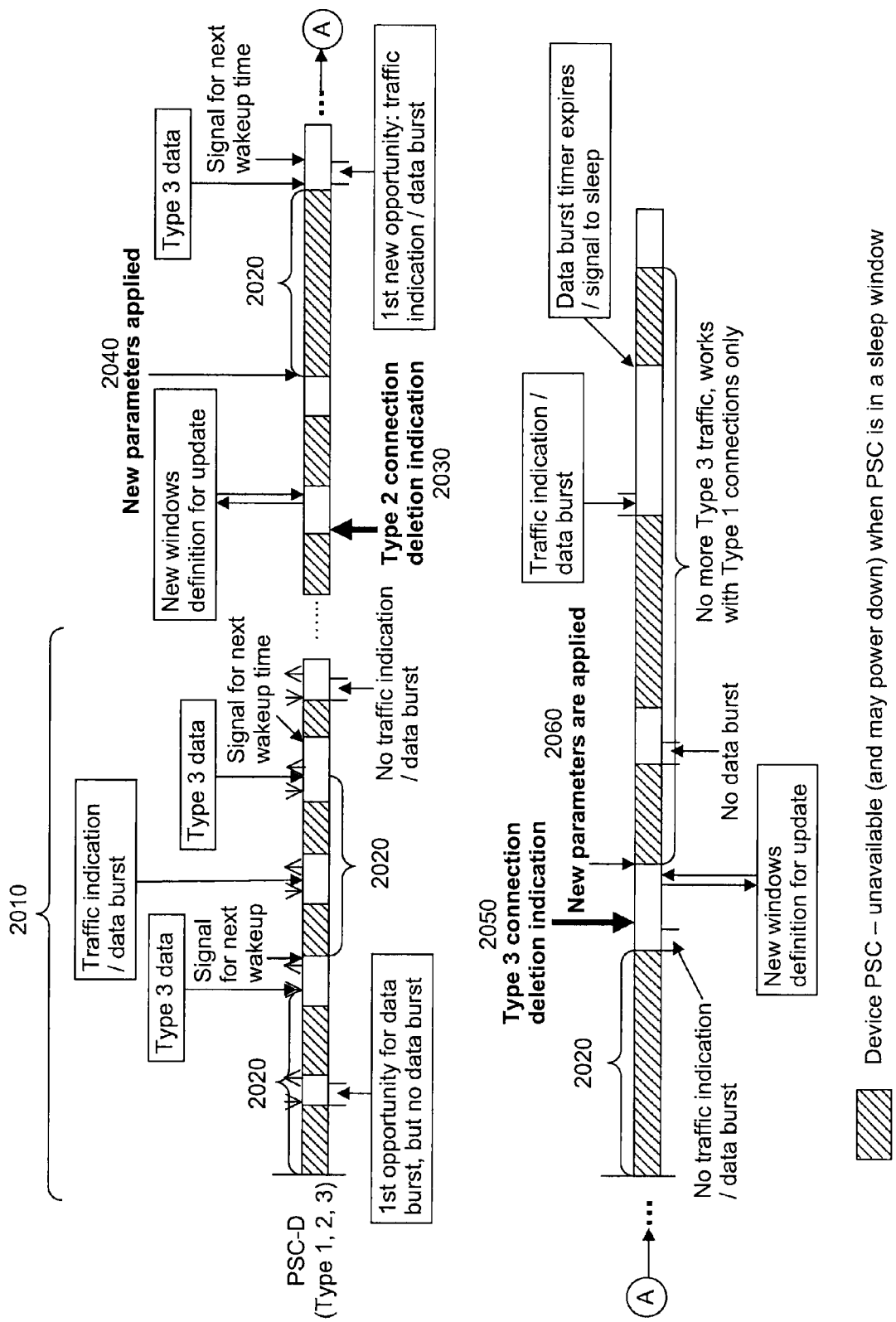
FIG. 20 is an exemplary diagram including a horizontal time axis, illustrating available and unavailable intervals of a mobile device based on sleep and listening windows of multiple connections with different Types that are combined into a PSC-D and the deletion of one or more connections Types from the PSC-D, consistent with certain disclosed embodiments.

FIG. 20 is an exemplary diagram including a horizontal time axis, illustrating availability and unavailability intervals of a mobile device, e.g., MS 130, based on sleep and listening windows of multiple connections with different Types that are combined into a PSC-D and the deletion of one or more connection types from the PSC-D. As shown in the exemplary embodiment of FIG. 20, when there are at least one Type 1 connection, one Type 2 connection, and one Type 3 connection, these connections may be combined into a single PSC-D (Type 1, 2, 3). FIG. 20 shows an example of such a PSC-D (Type 1, 2, 3) in which all the Type 2 connections are deleted from the PSC-D, and later, all the Type 3 connections are deleted from the PSC-D.

As was described with regard to FIG. 17, the PSC-D (Type 1, 2, 3) shown in FIG. 20 may have a default listening window and sleep window based on the virtual ePSC-T2 default listening window and sleep window. Every n listening windows, there may be Type 1 activity allowed. The number n is the traffic indication message occurrence counter. It defines the number of sleep cycles (sleep and listening windows), as can be measured by the number of default listening windows, before a traffic indication message is sent. A predicted Type 3 inactivity time 2020 may be longer than one default listening window and one default sleep window. Not every default listening window must have traffic activity of every Type allowed in that default listening window. Various timers and/or signals previously discussed may extend the default listening window into the next sleep window.

If the last Type 2 connection drops out (2030), that is, is deleted, the parameters of the PSC-D may change (2040). The PSC-D may go from a PSC-D (Type 1, 2, 3) to a PSC-D (Type 1, 3). When the last connection of a Type is deleted, during that or the next default listening window, BS 110 and MS 130 may negotiate the new PSC-D window parameters, by, for example, signaling back and forth. In an alternative embodiment, BS 110 or MS 130 may unilaterally inform the other of the new PSC-D window parameters, and when those windows go into effect. In a subsequent default listening window, the new sleep and default listening windows may be applied. In the case illustrated in FIG. 20, the PSC-D is now a PSC-D (Type 1, 3). The PSC-D may operate as a PSC-D (Type 1, 3) for some duration.

In FIG. 20, if the last Type 3 connection drops out (2050), that is, is deleted, the parameters of the PSC-D may change (2060). The PSC-D may go from a PSC-D (Type 1, 3) to an ePSC-T1. When the last connection of a Type is deleted, during that or the next default listening window, BS 110 and MS 130 may negotiate the new PSC-D window parameters, by, for example, signaling back and forth. In an alternative embodiment, BS 110 or MS 130 may unilaterally inform the other of the new PSC-D window parameters, and when those windows go into effect. In a subsequent default listening window, the new sleep and default listening windows may be applied. In the case illustrated in FIG. 20, the PSC-D is now an ePSC-T1.

As previously explained, the PSC-D is a single power saving class for all traffic between MS 130 and BS 110. PSC-D(Type 1, 2), PSC-D(Type 1, 3), PSC-D(Type 2, 3), and PSC-D(Type 1, 2, 3) are used to illustrate different traffic conditions and/or configurations. Other traffic conditions and/or configuration may also be used.

It will be apparent to those skilled in the art that various modifications and variations can be made in the method and apparatus for a device power savings class in a wireless communications network. It is intended that the standard and examples be considered as exemplary only, with a true scope of the disclosed embodiments being indicated by the following claims and their equivalents.

The invention claimed is:

1. A method for forming a device power savings class for a device operable in a wireless communications network, the device including one or more of one or more Type 1 connections, one or more Type 2 connections, and one or more Type 3 connections, comprising:
   defining one or more enhanced power savings classes including one or more of:
   defining for the device a virtual enhanced Type 1 power savings class from the Type 1 connections, if one or more Type 1 connections are active on the device;
   defining for the device a virtual enhanced Type 2 power savings class from the Type 2 connections, if one or more Type 2 connections are active on the device; and
   defining for the device a virtual enhanced Type 3 power savings class from the Type 3 connections, if one or more Type 3 connections are active on the device; and
   combining the Type 1 connections, if present on the device, the Type 2 connections, if present on the device, and the Type 3 connections, if present on the device, into the device power savings class for the device, based on the definitions of the virtual enhanced Type 1 power savings class, Type 2 power savings class, and Type 3 power savings class, if any are present on the device, wherein the Type 1 connections carry the best effort service, the Type 2 connections carry a real-time service, the Type 3 connections carry a multicast or the management service, the virtual enhanced Type 1 power savings class is formed of all the Type 1 connections, the virtual enhanced Type 2 power savings class is formed of all the Type 2 connections, and the virtual enhanced Type 3 power savings class is formed of all the Type 3 connections.

2. The method as in claim 1, wherein:
   defining the virtual enhanced Type 1 power savings class further includes:
   determining constraints of any Type 1 connections;
   setting a duration for a traffic timer;
   setting a default listening window;
   setting a duration for an initial sleep window;
   setting a duration for a Hybrid Automatic Repeat ReQuest (HARQ) traffic timer;
   initiating the HARQ traffic timer if a HARQ operation is started for a data retransmission;
   setting a new initial sleep window after reception of traffic data;
   selecting a sleep window start time such that subsequent listening windows intermittently overlap a super frame header;
   restarting the HARQ traffic timer if the HARQ traffic timer expires abnormally; and
   entering the sleep window if all active timers expire normally;
   defining the virtual enhanced Type 2 power savings class further includes:
   determining constraints of any Type 2 connections;
   setting a duration for a default listening window;
   setting a duration for a sleep window;
   setting a duration for a HARQ traffic timer;
   if no data is transmitted, entering the sleep window at the end of the default listening window;
   initiating the HARQ traffic timer if a HARQ operation is started for a data retransmission;
   restarting the HARQ traffic timer if the HARQ traffic timer expires abnormally; and
   entering the sleep window if the HARQ traffic timer expires normally;
   defining the virtual enhanced Type 3 power savings class further includes:
   setting a duration for a sleep window equal to a predicted inactivity time;
   setting a duration for a HARQ traffic timer;
   setting a default listening window based on at least the HARQ traffic timer;
   initiating the HARQ traffic timer if a HARQ operation is started for a data retransmission;
   restarting the HARQ traffic timer if the HARQ traffic timer expires abnormally; and
   entering a sleep window if all active timers expire normally.

3. The method as in claim 1, wherein combining the Type 1 connections, if present on the device, the Type 2 connections, if present on the device, and the Type 3 connections, if present on the device, into the device power savings class for the device, based on the definitions of the virtual enhanced Type 1 power savings class, Type 2 power savings class, and Type 3 power savings class, if any are present on the device further includes:
   if only the enhanced Type 1 and the enhanced Type 2 power savings classes are present, creating the device power savings class by combining all the Type 1 connections and Type 2 connections into the device power savings class, wherein the device power savings class includes a HARQ traffic timer, a sleep window duration, a default listening window duration, and a traffic indication message occurrence counter;
   if only the enhanced Type 2 and the enhanced Type 3 power savings classes are present, creating the device power savings class by combining all the Type 2 connections and Type 3 connections into the device power savings class, wherein the device power savings class includes a HARQ traffic timer, a sleep window duration, a default listening window duration, and a predicted inactivity time;
   if the enhanced Type 1, the enhanced Type 2, and the enhanced Type 3 power savings classes are present, creating the device power savings class by combining all the Type 1 connections, Type 2 connections, and Type 3 connections into the device power savings class, wherein the device power savings class includes a HARQ traffic timer, a sleep window duration, a default listening window duration, a predicted inactivity time, and a traffic indication message occurrence counter;
   if only the enhanced Type 1 and the enhanced Type 3 power savings classes are present, creating the device power savings class by combining all the Type 1 connections and Type 3 connections into the device power savings class, wherein the device power savings class includes a HARQ traffic timer, a sleep window duration, a default listening window duration, a predicted inactivity time, and a traffic indication message occurrence counter;
   if only the enhanced Type 1 power savings class is present, making the enhanced Type 1 power savings class the device power savings class;
   if only the enhanced Type 2 power savings class is present, making the enhanced Type 2 power savings class the device power savings class; and
   if only the enhanced Type 3 power savings class is present, making the enhanced Type 3 power savings class the device power savings class.

4. The method as in claim 1, further including the device power savings class may dynamically update one or more of start times or duration of default listening windows, sleep windows, and any timers, if present, if one or more connections are deleted or added.

5. The method as in claim 4, further including dynamically updating the device power savings class when the deleted or added connection does not also delete or add the enhanced power savings class, wherein the dynamically updating includes:
- determining if any connections have been deleted or added;
- determining if the deletion of the one or more connections change the start times or durations of the sleep window, default listening window, or timer of any of the virtual enhanced power savings classes;
- updating the start time or duration of the sleep window, default listening window, or any of the timers of the virtual enhanced power savings classes, if any were determined to change;
- determining if updating any of the virtual enhanced power savings classes changed the start times or durations of the sleep window, default listening window, or timers of the device power savings class;
- updating the start time or duration of the sleep window, default listening window, or any of the timers of the device power savings class, if any were determined to change;
- determining when the new device power saving class definitions, if any, are applied; and
- applying the new device power saving class definitions.

6. The method as in claim 4, further including dynamically updating the device power savings class when the deleted or added connection also deletes or adds at least one virtual enhanced power savings class, including:
- determining if any virtual enhanced power savings classes have been deleted or added;
- setting a new device power savings class based on the current virtual enhanced power savings class or classes;
- determining when the new device power saving class definition is applied;
- applying the new device power saving class definitions.

7. The method as in claim 1, wherein the wireless communications network is compliant with IEEE 802.16e standard.

8. A wireless communication mobile station for wireless communication, the wireless communication mobile station configured for one or more of one or more Type 1 connections, one or more Type 2 connections, and one or more Type 3 connections, the wireless communication mobile station comprising:
- at least one memory to store data and instructions; and
- at least one processor configured to access the memory and configured to, when executing the instructions:
- define one or more enhanced power savings classes including one or more of:
- define for the mobile station a virtual enhanced Type 1 power savings class from the Type 1 connections, if one or more Type 1 connections are active on the mobile station;
- define for the mobile station a virtual enhanced Type 2 power savings class from the Type 2 connections, if one or more Type 2 connections are active on the mobile station; and
- define for the mobile station a virtual enhanced Type 3 power savings class from the Type 3 connections, if one or more Type 3 connections are active on the mobile station; and
- combine the Type 1 connections, if present on the mobile station, the Type 2 connections, if present on the mobile station, and the Type 3 connections, if present on the mobile station, into the device power savings class for the mobile station, based on the definitions of the virtual enhanced Type 1 power savings class, Type 2 power savings class, and Type 3 power savings class, if any are present on the mobile station, wherein the Type 1 connections carry the best effort service, the Type 2 connections carry a real-time service, the Type 3 connections carry a multicast or the management service, the virtual enhanced Type 1 power savings class is formed of all the Type 1 connections, the virtual enhanced Type 2 power savings class is formed of all the Type 2 connections, and the virtual enhanced Type 3 power savings class is formed of all the Type 3 connections.

9. The wireless communication mobile station as in claim 8, wherein:
- define the virtual enhanced Type 1 power savings class further includes:
- determine constraints of any Type 1 connections;
- set a duration for a traffic timer;
- set a default listening window;
- set a duration for an initial sleep window;
- set a duration for a Hybrid Automatic Repeat ReQuest (HARQ) traffic timer;
- initiate the HARQ traffic timer if a HARQ operation is started for a data retransmission;
- set a new initial sleep window after reception of traffic data;
- select a sleep window start time such that subsequent listening windows intermittently overlap a super frame header;
- restart the HARQ traffic timer if the HARQ traffic timer expires abnormally; and
- enter the sleep window if all active timers expire normally;
- define the virtual enhanced Type 2 power savings class further includes:
- determine constraints of any Type 2 connections;
- set a duration for a default listening window;
- set a duration for a sleep window;
- set a duration for a HARQ traffic timer;
- if no data is transmitted, enter the sleep window at the end of the default listening window;
- initiate the HARQ traffic timer if a HARQ operation is started for a data retransmission;
- restart the HARQ traffic timer if the HARQ traffic timer expires abnormally; and
- enter the sleep window if the HARQ traffic timer expires normally;
- define the virtual enhanced Type 3 power savings class further includes:
- set a duration for a sleep window equal to a predicted inactivity time;
- set a duration for a HARQ traffic timer;
- set a default listening window based on at least the HARQ traffic timer;
- initiate the HARQ traffic timer if a HARQ operation is started for a data retransmission;
- restart the HARQ traffic timer if the HARQ traffic timer expires abnormally; and
- enter a sleep window if all active timers expire normally.

10. The wireless communication mobile station as in claim 8, wherein the at least one processor, when executing the instructions to combine the Type 1 connections, if present on the mobile station, the Type 2 connections, if present on the mobile station, and the Type 3 connections, if present on the mobile station, into the device power savings class for the mobile station, based on the definitions of the virtual enhanced Type 1 power savings class, Type 2 power savings class, and Type 3 power savings class, if any are present on the mobile station is further configured to:

if only the enhanced Type 1 and the enhanced Type 2 power savings classes are present, create the device power savings class by combining all the Type 1 connections and Type 2 connections into the device power savings class, wherein the device power savings class includes a HARQ traffic timer, a sleep window duration, a default listening window duration, and a traffic indication message occurrence counter;

if only the enhanced Type 2 and the enhanced Type 3 power savings classes are present, create the device power savings class by combining all the Type 2 connections and Type 3 connections into the device power savings class, wherein the device power savings class includes a HARQ traffic timer, a sleep window duration, a default listening window duration, and a predicted inactivity time;

if the enhanced Type 1 , the enhanced Type 2 , and the enhanced Type 3 power savings classes are present, create the device power savings class by combining all the Type 1 connections, Type 2 connections, and Type 3 connections into the device power savings class, wherein the device power savings class includes a HARQ traffic timer, a sleep window duration, a default listening window duration, a predicted inactivity time, and a traffic indication message occurrence counter;

if only the enhanced Type 1 and the enhanced Type 3 power savings classes are present, create the device power savings class by combining all the Type 1 connections and Type 3 connections into the device power savings class, wherein the device power savings class includes a HARQ traffic timer, a sleep window duration, a default listening window duration, a predicted inactivity time, and a traffic indication message occurrence counter;

if only the enhanced Type 1 power savings class is present, make the enhanced Type 1 power savings class the device power savings class;

if only the enhanced Type 2 power savings class is present, make the enhanced Type 2 power savings class the device power savings class; and if only the enhanced Type 3 power savings class is present, make the enhanced Type 3 power savings class the device power savings class.

11. The wireless communication mobile station as in claim 8, further including the at least one processor, when executing the instructions, dynamically updating one or more of start times or durations of default listening windows, sleep windows, and any timers, if present, on the device power savings class, if one or more connections are deleted or added.

12. The wireless communication mobile station as in claim 11, wherein the at least one processor, when executing instructions to dynamically update the device power savings class when the deleted or added connection does not also delete or add the virtual enhanced power savings class, is further configured to, when executing instructions:

determine if any connections have been deleted or added;

determine if the deletion of the one or more connections change the start times or durations of the sleep window, default listening window, or timer of any of the virtual enhanced power savings classes;

update the start time or duration of the sleep window, default listening window, or any of the timers of the virtual enhanced power savings classes, if any were determined to change;

determine if updating any of the virtual enhanced power savings classes changed the start times or durations of the sleep window, default listening window, or timers of the device power savings class;

update the start time or duration of the sleep window, default listening window, or any of the timers of the device power savings class, if any were determined to change;

determine when the new device power saving class definitions, if any, are applied; and apply the new device power saving class definitions.

13. The wireless communication mobile station as in claim 11, wherein the at least one processor, when executing instructions to dynamically update the device power savings class when the deleted or added connection also deletes or adds at least one virtual enhanced power savings class, is further configured to, when executing instructions:

determine if any virtual enhanced power savings classes have been deleted or added;

set a new device power savings class based on the current virtual enhanced power savings class or classes;

determine when the new device power saving class definition is applied;

apply the new device power saving class definitions.

14. The wireless communication mobile station as in claim 8, wherein the wireless communications network is compliant with IEEE 802.16e standard.

15. A method for a device in a wireless communication network including a base station, comprising:

sending a sleep mode request to the base station;

receiving a sleep mode response including a single power saving class from the base station;

entering a sleep mode determined by the single power saving class applicable to all traffic conditions between the device and the base station; and communicating with the base station based on the sleep mode, wherein the single power saving class is used to define a frame structure for configuring frames to form alternating listening windows and sleep windows, to define an initial sleep window, and to define a default listening window.

16. The method as in claim 15, wherein the frames are configured in a series of patterns each pattern including one of the listening windows followed by one of the sleep windows.

17. The method as in claim 15, further including:

setting a duration of one of the listening windows;

setting and starting a traffic timer corresponding to the one listening window and associated with traffic activity; and starting one of the sleep windows following the one listening window if there is a termination of the one listening window and the traffic timer is expired.

18. The method as in claim 17, further including:

restarting the traffic timer if there is traffic data before the traffic timer expires.

19. The method as in claim 18, further including:

setting and starting a Hybrid Automatic Repeat ReQuest (HARQ) traffic timer associated with a data retransmission;

extending the one listening window when an Acknowledgement (ACK) is not received after a transmission and the HARQ traffic timer is not expired;

restarting the HARQ traffic timer before the HARQ traffic timer expires when a Negative Acknowledgement (NAK) is received after the transmission; and expiring the HARQ traffic timer if an ACK is received after the transmission.

20. The method as in claim 19, further including:
repeating restarting the HARQ traffic timer before the restarted HARQ traffic timer expires when a Negative Acknowledgement (NAK) is received after the transmission; and
starting the one sleep window following the one listening window if a number of times of restarting the HARQ traffic timer reaches a predetermined number or the HARQ traffic timer expires.

21. The method as in claim 15, further including:
setting a duration for a traffic timer;
setting a duration of the default listening window;
setting a duration for one of the sleep windows based on the initial sleep window;
setting a duration for a Hybrid Automatic Repeat ReQuest (HARQ) traffic timer;
initiating the HARQ traffic timer if a HARQ operation is started for a data retransmission;
setting a new duration of the initial sleep window after reception of traffic data;
setting a new duration of the one sleep window based on the initial sleep window if there is no reception of the traffic data during the default listening window;
restarting the HARQ traffic timer if the HARQ traffic timer expires abnormally; and
starting the one sleep window if all active timers expire normally.

* * * * *